United States Patent [19]
Roberts

[11] Patent Number: 5,287,453
[45] Date of Patent: Feb. 15, 1994

[54] FAST REMOTE FILE ACCESS FACILITY FOR DISTRIBUTING FILE ACCESS REQUESTS IN A CLOSELY COUPLED COMPUTER SYSTEM

[75] Inventor: William F. Roberts, Acton, Mass.

[73] Assignee: Bull HN Information Systems Inc., Billerica, Mass.

[21] Appl. No.: 584,544

[22] Filed: Sep. 18, 1990

[51] Int. Cl.$^5$ .................. H04L 12/44; G06F 13/00
[52] U.S. Cl. .................. 395/200; 364/DIG. 1; 364/228.7; 364/228.8; 364/242.94; 364/242.96; 364/260; 364/260.1; 395/600
[58] Field of Search .................. 395/200, 600

[56] References Cited

U.S. PATENT DOCUMENTS

| | | | |
|---|---|---|---|
| 4,112,488 | 9/1978 | Smith, III | 395/200 |
| 4,274,139 | 6/1981 | Hodgrinson et al. | 395/200 |
| 4,805,134 | 2/1989 | Calo et al. | 395/600 |
| 4,825,354 | 4/1989 | Agrawal et al. | 395/600 |
| 4,851,988 | 7/1989 | Trotter et al. | 395/200 |
| 4,887,204 | 12/1989 | Johnson et al. | 395/600 |
| 5,124,909 | 6/1992 | Blakely et al. | 395/200 |
| 5,146,561 | 9/1992 | Carey et al. | 395/200 |

OTHER PUBLICATIONS

VAXclusters: A Closely-Coupled Distributed System by N. P. Kronenberg, H. M. Levy & W. D. Strecker.

*Primary Examiner*—Dale M. Shaw
*Assistant Examiner*—Lance L. Barry
*Attorney, Agent, or Firm*—Faith F. Driscoll; John S. Solakian

[57] ABSTRACT

A cluster computer system includes a plurality of independently operated computer systems located in close proximity to each other. Each system includes a system bus, a memory, and a set of local peripheral devices which connect in common to the system bus. The computer systems are interconnected for transferring messages to each other through the channels of a high speed cluster controller which connect to the system buses. Each system further includes a cluster driver which transfers the messages between the memory of the computer system and the corresponding cluster controller channel when the system is configured to operate in a cluster mode of operation. User application programs issue monitor calls to access files contained on a peripheral device(s). The fast remote file access (FRFA) facility included in each system upon detecting that the peripheral device is not locally attached, packages the monitor call and information identifying the user application into a message. The message is transferred through the cluster driver and cluster controller to the FRFA of the computer system to which the peripheral device attaches. The monitor call is executed and the response is sent back through the cluster controller and delivered to the user application in a manner so that the peripheral device of the other computer systems appears to be locally attached and the monitor call appears to be locally executed.

23 Claims, 10 Drawing Sheets

FAST REMOTE FILE ACCESS FACILITY FOR DISTRIBUTING FILE ACCESS REQUESTS IN A CLOSELY COUPLED COMPUTER SYSTEM

BACKGROUND OF THE INVENTION

1. Field of Use

The present invention relates to multicomputer systems and more particularly, to closely coupled multicomputer systems.

2. Prior Art

It is well known to interconnect several independently operated computer systems together for processing jobs. In one well known type of arrangement, a master computer system is connected to transfer programs and data to higher speed slave systems through a high speed peripheral device such as a disk for execution. A scheduling program being executed by the master system determines which programs should be activated on which slave system. This type of system has been characterized as a a loosely coupled system because of the physical separation of the computer systems, message-oriented interprocessor communication and independent operating systems.

In other types of loosely coupled systems, certain resources are defined as global meaning that they are accessible from all parts of the system as if they were located on the system on which the user is located. In this type of system, it is necessary to provide for sessions during which a user of one system can utilize a resource attached to another system. This makes it necessary to provide for synchronizing the use of these resources so that access is provided to the most current version at any given instant of time. Also, there is a limitation as to the number of sessions which can take place simultaneously. An example of this type of system is disclosed in U.S. Pat. No. 4,851,988.

Another type of multicomputer system termed a closely coupled distributed system includes a number of separate processors and memories connected by a message oriented computer interconnect organized as a star coupler having radial ports to which the processors connect. Each port is responsible for arbitration, path selection and data transmission. In this system, although the files can be shared, the file management facilities are unaware of whether they are executing in a clustered environment. Therefore, additional means in the form of a distributed lock manager is provided for synchronizing cluster file activity. This increases overhead and inter-node traffic in determining when a requested resource can be accessed. The result is increased system complexity. This system is described in an article titled, "VAXclusters: A Closely-Coupled Distributed System," published in ACM Transactions on Computer Systems, Vol. 4, No., May 1986.

Accordingly, it is a primary object of the present invention to provide a closely-coupled system which maximizes the use of available operating system facilities.

It is further object of the present invention to provide a closely-coupled system which requires no changes to be made in the applications being run on the system.

SUMMARY OF THE INVENTION

The above objects are achieved in a closely-coupled computer system which includes a preferred embodiment of the present invention. The computer system includes a plurality of independently operated computer systems (i.e. each computer system has its own identical copy of the operating system) which are located in close proximity to each other. Each system includes a system bus, a memory and a set of local peripheral devices, all of which connect in common to the system bus. A high speed cluster controller interconnects the system buses of the systems together through a corresponding number of ports or channels.

The invention enables messages to be transferred between systems through the high speed cluster controller and a cluster driver included within each system when the system is enabled to operate in a cluster mode of operation. The driver provides an interface to the cluster controller and is operatively connected to a fast remote file access (FRFA) facility which is included as part of the operating system of each system when the system is enabled to operate in cluster mode.

In the above arrangement, the FRFA facility responds to monitor or system calls from user application programs being executed by a system. Upon determining that the user requires the use of a peripheral device attached to another system, the FRFA facility using the existing file management facilities of the operating system expanded for cluster operation which generates a message designating the complete path and specific peripheral device in the other system requested by the user. This message is transferred through the cluster driver and cluster controller to the FRFA facility of the other system. This operation is accomplished in a manner which makes the sets of peripheral devices of the other computer systems similarly enabled to operate in cluster mode appear to the user to be locally attached to the system bus of that system.

The arrangement of the present invention eliminates the need to continually issue messages since the determination of whether the object is a local or remote peripheral device is carried out at a sufficiently high level so as to eliminate the need for additional analysis. Also, the present invention maximizes its use of existing operating system modules such as a monitor call and file management facilities. Thus, synchronization and file access protection can be performed without having to add new modules. In this way, the same or original user application program identification (ID) can be used for performing operations on peripheral devices which are located both locally and remotely to the user.

Additionally, according to the teachings of the present invention, the computer systems include means for assigning a predetermined one of the systems enabled to operate in cluster mode to perform as a supervisory or master role when the computer system is started up or during operation when a system member is required to leave the cluster. The master has responsibility for performing the functions of adding new computer system members in addition to deleting computer system members in the event of failure or shutdown. Additionally, the master operates to carry out automatic volume recognition (AVR) and deadlock detection operations on a cluster-wide basis.

This arrangement minimizes the overall complexity of the system, in addition to minimizing exchanging messages, updating tables, etc. It also makes it possible to use a minimum number of commands in order to enable the system for cluster operation, starting up and shutting down cluster members.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

DETAILED DESCRIPTION OF THE PREFERRED EMBODIMENT

Figure 1:
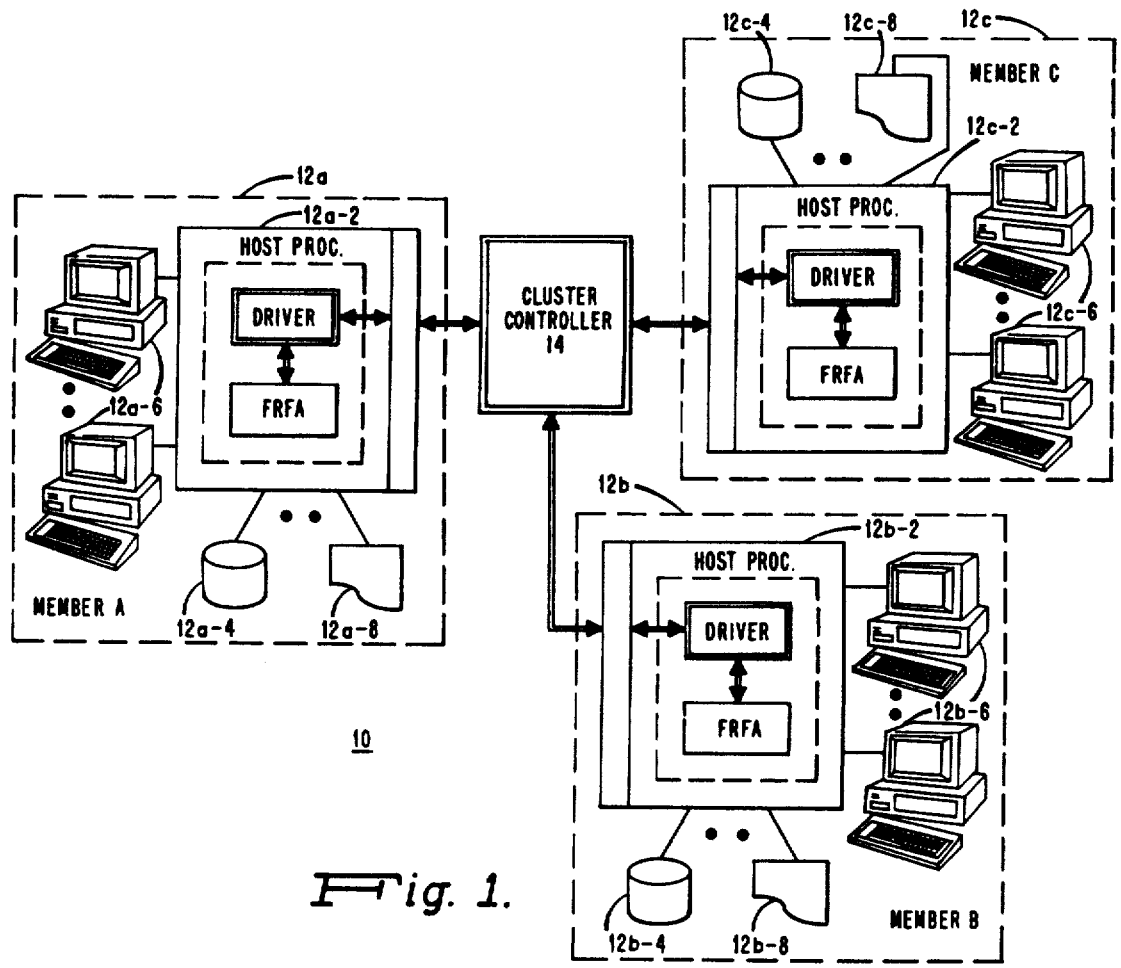
FIG. 1 is a block diagram of a computer system which is configured for cluster operation according to the present invention.

FIG. 1 shows the system of the embodiment of the present invention. As shown, the system 10 includes a plurality of independently operated computer systems 12a through 12c interconnected to exchange information through a cluster controller 14. As shown, each computer system includes a host processor 12-2 in which a fast remote file access (FRFA) facility and cluster driver are resident when the system has been configured to operate in cluster mode as described herein. Also, each system includes external storage 12-4 such as disk storage on which the operating system software and data files reside, a plurality of cathode ray tube (CRT) display units 12-6 and one or more output devices such as a printer 12-8.

Each of the host computers 12-2 can be considered conventional in design and may, for example, take the form of DPS6, DPS6 PLUS or DPS6000 minicomputer system manufactured by Bull HN Information Systems Inc. Any combination of these systems may be used since the only requirement is that they have installed an identical copy of the same operating system which in the preferred embodiment corresponds to either the GCOS6 MOD400, Release 4.1 or HVS6 operating system.

The cluster controller 14 provides a high speed message transfer link between computer system members (i.e., 12a through 12c). The cluster controller 14 can interconnect up to 16 computer systems. The cluster controller 14 includes a main processor board which connects through a memory interface to a memory subsystem in addition to up to 16 sets of member connection boards.

Each computer system cluster member is connected through a pair of similarly constructed channel interface boards and a set of cables whose length places the system in close proximity to the other cluster members. A channel device interface board is installed on a mother board of an adapter in a disk subsystem controller system bus slot of the host processor 12-2 while the other channel interface board is installed in the cluster controller 14.

The host processor adapter also includes an input/output processor (IOP) daughter board for managing all host system bus activity. The IOP processor board plugs into the channel interface board and provides a multichannel logical interface to cluster controller 14 through the host processor channel interface board. The host cluster controller processor and host IOP processor operate on a master-slave basis in transferring messages such that the cluster controller appears to each computer system as an intelligent multichannel/port high speed memory. The cluster controller processor monitors member availability and manages a FIFO message queue of each computer system member.

More specifically, it performs the following functions for each system member: reads a message from the FIFO assigned to the member, writes a message to one or more member FIFO queues, reads status, deletes a message from the front of the FIFO assigned to the member and writes or reads an emergency message. All of these functions are performed using a specific communications protocol which, for the purposes, can be considered conventional. Cluster controller 14 also monitors the receipt of "I am alive" messages from each member in which case the nonreceipt of such a message at an established, regular time interval, results in the cluster controller providing a status update via an interrupt indicating that the member has failed in addition to removing all messages queued for the failed member from the FIFO's of the remaining members.

For the purpose of the present invention, the cluster controller 14 can be considered conventional in design. For example, the cluster controller may take the form of the cluster controller device manufactured by Copernique Corporation.

MONITOR CALL HANDLER MODULE 12-140

Figure 2:
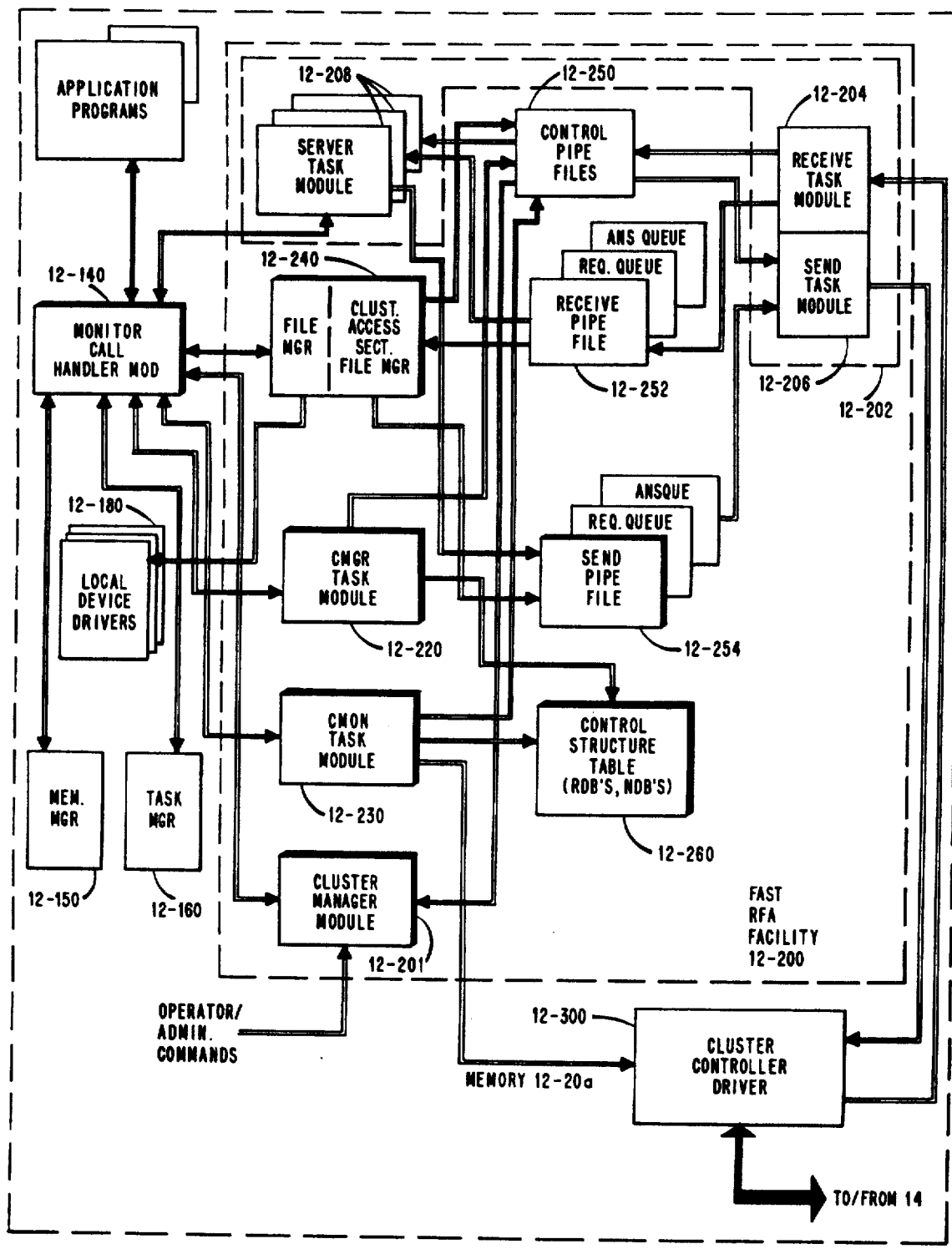
FIG. 2 shows in greater detail, the major modules of the fast remote file access (FRFA) facility of FIG. 1.

The monitor call handler module 12-140 provides a standard interface which is capable of handling all of the different types of system monitor calls generated by user application programs, in addition to Fast RFA facility 12-200, as explained herein. The use of this standard interface eliminates the need to make any change in any user application program. The types of calls handled by the module 12-140 are described in detail in the publication entitled, "DPS6 GCOS6 MOD400 System Programmer's Guide—Volume II," Copyright Honeywell Information Systems Inc. 1986, Order No. CZ06-01C. As shown in FIG. 2, module 12-140 takes the different system monitor calls and passes them on to the appropriate part of the operating system for servicing. For example, memory allocation calls are serviced by the memory manager module 12-150, task request calls are serviced by a task manager module 12-160 and file request calls are serviced by a file manager module 12-240 which forms part of the FRFA facility 12-200 present invention.

CLUSTER MANAGER MODULE 12-201 AND FILE MANAGER MODULE 12-240

The cluster manager module 12-201 of FIG. 2 provides an interface between Fast RFA facility 12-200 and the operator or system adminstrator. The module 12-201 receives certain commands entered via one of the terminals 12a-6. In response to such commands, module 12-201 generates a predetermined sequence of system calls to monitor call module 12-140 which results in an allocation of system resources and generation of necessary control structures and tasks required for enabling the system to operate in a cluster mode of operation as explained herein.

FAST REMOTE FILE ACCESS (FRFA) FACILITY

FIG. 2 shows in greater detail, the FRFA facility of FIG. 1. The Fast RFA facility includes a number of modules which are loaded into the main memory of a host processor 12-2 when the facility is started up by an operator or administrator via a cluster manager (CM) command entered from the system console or terminal 12a-6 as explained later herein. These modules become resident as a result of a CM -START command which spawns a control group consisting of multiple tasks.

As seen from FIG. 2, the main modules of the Fast RFA facility 12-20 include a cluster manager (CM) module 12-201, a cluster file manager (CFM) module 12-202, a cluster monitor (CMON) module 12-230 and a monitor call handler module 12-240. The CM module 12-201 receives commands entered by an operator or system administrator via an input terminal 12a-6 of FIG. 1. The CFM module 12-202 includes a receive task module 12-204 and a send task module 12-206 and a plurality of server task modules 12-208. The send and receive task modules 12-204 and 12-206 connect to a cluster controller driver 12-300 for transmitting and receiving messages to and from cluster controller 14 which are formatted according to a preestablished communications protocol.

Additionally, as shown, the send and receive modules 12-206 and 12-204 are connected to send/receive messages to/from the server task module 12-208, the CMGR module 12-220, the CMON module 12-230, monitor call handler module 12-240 through one of a number of control pipe files 12-250, a receive pipe file 12-252 and a send pipe file 12-254.

The Fast RFA facility 12-200 also includes a control structure table containing a list of available members and system devices accessed by the CMGR and CMON modules 12-220 and 12-230 as explained therein.

The file module 12-240 includes the conventional shared data structure and set of routines normally provided to perform functions that access the data structure to control the synchronization of concurrent processes or tasks in addition to performing various system services or functions. That is, the module 12-240 responds to a system service monitor call which results in the specified system service being executed by the operating system supervisory or executive on behalf of a running user application program. File system services include functions such as creating or deleting files, reserving files for processing, and reading or writing records or blocks in files. The monitor call identifies the service being requested by means of a function code. The call also loads into certain registers, the information expected by the requested system service routine.

As indicated, the file manager module 12-240 translates the requests or file system monitor calls received from handler 12-140 generated by an application program such as to open, create, read, write, or close a directory or named file into requests or messages that the low-level peripheral device driver can understand. That is, for example, in the case of a disk device, the file-oriented, logical requests are transformed into one or more commands to the disk driver to read or write specific disk sectors. The file manager module 10-240 performs this translation with the aid of tables, structures and directories contained in the physical file system. The physical file system can be viewed as the sum of the tables, directories, files and other structures that allow data to be stored and retrieved by name. The physical file system includes the ability to track and allocate the remaining free space on a physical unit of a storage medium which is referred to as a "volume" (e.g., a removal disk or reel of tape).

The file system manager module 10-240 includes an automatic volume recognition (AVR) software facility which recognizes when a volume has been mounted or dismounted locally. Lastly, the file manager module 10-240 also, in support of synchronizing processes, includes facilities for detecting and preventing logical record "deadlock" conditions.

According to the teachings of the present invention, the file system manager module 12-240 of the Fast RFA facility 12-200 has been expanded to handle a number of cluster specific monitor calls as shown in FIG. 2. These are used to attach/detach a local member to/from the cluster, open/close access to other (remote) members of the cluster and provide access to devices and volumes at other members.

More specifically, the monitor calls for cluster mode of operation include an access to cluster monitor call (MCL$CLACC), an access to member monitor call (MCL$MBACC), an access to device monitor call (MCL$DVACC) and an access to volume monitor call (MCL$VLACC). The coding of these calls are shown in greater detail, in the Appendix.

In greater detail, the file system manager module 10-240 includes a $YCMOD routine which configures a remote device by creating a remote descriptor block RDB data structure and linking it to the chain of RDBs off of the system control block (SCB). It further includes a $YCMOC routine for opening/closing a local member. This routine gets and opens the cluster manager control pipe, it gets and opens the FRFA/cluster status file which is used by the servers to determine transaction states, gets and opens the FRFA/cluster error log file and it builds a cluster descriptor block (CDB) data structure. That is, it allocates a block of system memory and fills in the fields as follows:

| | |
|---|---|
| LOC0000 | CLUSTER NAME |
| LOC0006 | INDICATORS |
| LOC0007 | LOCAL MEMBER NAME |
| LOC0009 | LOCAL MEMBER NUMBER |
| LOC000A | POINTER TO CLUSTER MANAGER PIPE FCB FOR >>$$CATALOG>CM.PIPE |
| LOC000C | CLUSTER STATISTICS - ADDRESS OF FCB |
| LOC001C | SIZE OF CDB. |

The $YCMOC routine also stores the CDB pointer value (SCB.S_CDBP) into the SCB for referencing, while the member system is being operated in cluster mode of operation, as well as opening/closing the cluster parameter structure block (PSB). For a close operation, the reverse of the above operations is performed which involves removing the associated files and deletion of the remote description block (RDB) structure (description of remote devices).

A further routine $YCMOM operates to open and close cluster members, in response to an access to member monitor calls. For an open operation, the routine builds the node descriptor block (NDB) structure and links it to the chain of NDB's (SCB.S_NDBP). It opens the member's send/receive message pipe files. In the case of a close operation, it wakes up user tasks waiting to receive a reply from the message receive pipe file with an error (member not available). It closes the member's send and receive message pipe files, marks NDB structure as closed to prevent any more requests. If there are no more users, it deletes the NDB structure, the RDB structures for the devices and member being removed.

A routine $YCMOV operates to recognize remote devices/volumes while a routine $CMGI operates to get information about cluster members by searching the chain of NDB's (SCB.S_ndbp). For example, for a disk device, it compares the volume name with those of the other disk drives to check for a duplicate. It also compares the volume name with a list of local volumes and wakes up any user programs waiting for a specific volume.

In the system of the present invention, the members of the cluster exchange a list of all of the disks, tapes and printers to be shared cluster wide. This eliminates the need for having to build a catalog identifying all resources to be referenced by a local member. Thus, when an operator wants to reference a named disk volume in the system, it is only necessary to mount the disk pack (volume) on the disk drive of some member. The system AVR software will recognize the volume locally and send a message to all other members informing them that the named volume has been mounted at that member. Assuming that it is the only disk pack so named, it will be identified as a local volume at each member in the cluster upon the issuance of a device status (STS) command. It is the function of the CMGR module 12-220 to ensure that the volume is unique within the cluster as discussed herein.

As concerns non-cluster operations, certain components of the file manager module 12-240 operate in a conventional manner in processing system service monitor calls for local peripheral devices. As indicated in FIG. 2, the file manager module 12-240 passes the requests or output messages to the appropriate device driver which translates them into formats and commands that the particular output device can interpret. Firmware routines included within the controller interface are programmed to respond to such commands for communicating them according to a defined protocol.

CLUSTER FILE

The CFM module 12-202 is constructed from a plurality of submodules which are included as part of the CFM modules of FIG. 2. The modules are a lead task submodule ZUCFM, a message reporter submodule ZUCFM0, a server code and echoing submodule ZURFM1, a cluster open member, a close cluster member and status member submodule ZUCFM2, a server start-up submodule ZURFM3, a transporter interface submodule ZUCFM4, a semaphore handling code submodule ZURFM6, a pipe, tube and wrap file code submodule ZURFM7, a server activity echoing submodule ZUCFM8 and a common file system utilities submodule ZUTILS.

The ZUCFM submodule is the entry point for the lead task of the CFM group. It handles the creation requesting, deleting of the CMON and CMGR modules and messages to/from receive, send task and server modules. It accepts messages from the task created by a CM command, from the CMON and CMGR tasks via the control pipe file 12-250 and attempts to perform the requested operations. Specifically, it receives messages from the cluster manager (CM) command specifying how many server tasks to create (CM -SERVERS n), messages requesting cluster member status (CM -STA-TUS) or messages specifying that it shut down the cluster facility (CM -STOP). It receives messages from the CMON task requesting that it open or close a cluster member. The submodules of particular interest to the present invention are the ZUCFM submodule and the ZUCFM2 submodule.

The CFM module 12-202 performs its operations using a number of control structures which were previously mentioned. These include the node control block (NCB), parameter structure block (PSB) structure, and the server control block (SCB) structure for each server task and special input request formatted messages.

The CFM lead task spawns all other necessary tasks. That is, in response to a macrocall, it constructs the required control/data structures for executing the task, activates the task and when the task becomes inactive, it deletes the task and its associated data structures. The tasks spawned include the number of server tasks specified by the CM message and if none are specified, the CFM module spawns eight such tasks. These tasks are cluster file manager tasks that act as servers to receive file system monitor call (MCL) messages from other cluster members to perform the requested service and to package the MCL response into an appropriate response message.

Each CFM module server task reads a request signal message from the CFM.SERVER pipe of control pipe files 12-250. The contents (C_TYPE) of the signal pipe message indicates whether the message is buffered in main memory or must be read from the specified message receive pipe <member.id>.RCV 12-252. A server task receives the message and performs the requested monitor call to monitor call handler module 12-140. In response to the call, file manager module 12-240 packages the monitor call response into a message and sends that message to the calling member through its corresponding send pipe file <member_id>.SND 12-254.

The CFM module 12-202 also spawns two tasks for each open non-local member of the cluster. One task receives messages from that member requesting services or responding to service requests and one task sends messages to that member requesting services or responding to service requests. The CFM send task reads messages contained in send pipe file 12-254, specifically, from a <member_id>.SND pipe and sends the messages to that member via the cluster driver 12-300 under the control of an Input/Output Request Block (IORB) data structure. The CFM receive task reads messages from that member via the cluster driver 12-300. If the message received is a response message (from a previous request sent to that member), then it is placed into the <member_id>.RCV pipe file 12-252. The record type, a numerical value used to categorize records contained in the response message (M_MID field), is used to connect the response to the application program which is waiting for it (by reading via that record type from the <member_ID>.RCV pipe 12-252) within a file system monitor call. This record type field is very important, because it allows multiple requests from multiple tasks to be queued for servicing by a remote member. By associating the response message to the requestor via the record type field, service requests can be processed in any order by the remote member. For example, a service request to "read a record via a key" from an indexed file may take a long time in searching index levels, data and overflow areas, while a simple "read next record" from a sequential file, although requested later, may actually finish sooner. If the message received is a server request message, then a signal message is created and sent directly to a local server task via a server signal pipe file (CFM.SERVER), not shown. If there is enough main memory, then the service request is kept in memory as indicated in the signal pipe message. If the request is too large to be buffered in main memory, then it is placed into the <member_id>.RCV pipe file 12-252 and will be read later into memory by a local server task.

CLUSTER MANAGER MODULE 12-220

The CMGR module 12-220 is a bound unit which, under the control of a task also created during the start-up of the CS group, manages the devices and volumes in the cluster. It sends messages to its counterpart (CMGR modules) in the Fast RFA facilities of other cluster members and exchanges messages containing device and volume information therewith for maintaining an up to date list of each device/volume in the cluster. The CMGR module 12-220 includes routines for performing an open-pipe function wherein it gets and opens a CM.PIPE file for a particular cluster member, a close-pipe function wherein it closes and removes a designated file, a read-pipe function wherein it reads from the control pipe file 12-250 $CATALOG>CM.PIPE, a to-CM function wherein it sends a message to another member cluster manager module and from_CM function wherein it takes appropriate action in response to a message received from another member CMGR module.

Additionally, CMGR module 12-220 includes a routine for performing an I_AM_master function. This function is executed after an existing cluster master member fails and a new cluster master member must be determined. It determines whether or not the cluster member is the "master" within the system. This is determined by calculating the number of the member which has the lowest member number in the cluster (first bit in an active or on state in a bit map). This number is then compared to the local member number. If the local member number is less than the lowest number in the bit map, then the local member is the master in which case the routine returns a true or ONE value. For example, if cluster member numbers 2, 4 and 6 are active and member 6 fails or is shut down, then member 2 becomes the new master.

It also includes routines for performing a to_CFM function wherein it sends a message to the CFM module group via control pipe 12-250 $CATALOG>CFM.PIPE and waits for a response before continuing, a CMON_msg function wherein it performs the operation specified by a message received from the CMON task, a CFM_answer function wherein it responds whenever a message is received from the CFM module, a notify_all function wherein it sends a global message gbl_msg to all of the members of the cluster and close_member function wherein access to the member specified by 'name' is closed down.

An AVR_action routine also included as part of the CMGR module is used whenever a message is received from the AVR software. When a message is received indicating that a volume has been mounted, it is the responsibility of the CMGR module to check with the master (if it is not the master) to determine if the volume can be mounted cluster wide (has a name with a unique value). This involves sending a message to the CMGR module of the master member via control pipe 12-250 $CATALOG>CM.PIPE. This results in the CMGR module of the master member sending a message to the CMGR module of each cluster member to determine if the name of the mounted volume/device is unique across the cluster. When the CMGR module of the master member determines that the mounted volume/device is unique, it then sends an appropriate message to the CMGR module of each cluster member indicating its approval of the mounted volume/device. This results in each CMGR module issuing an ACTIVATE volume call to its monitor call handler module 12-140. In response to such call, the cluster access section of file manager module 12-240 of each cluster member creates a RDB structure for the mounted volume/device.

When a local volume/device has been dismounted the AVR software of a cluster member sends a message to its CMGR task module. In a similar to that manner described above, the CMGR moule communicates with the master member which in turn informs the other members of the cluster to delete the RDB structure representative of the dismounted volume/device.

The CMGR module 12-220 keeps track of all of the semimounted volumes on its system that have not been approved for mounting by the master in the event of a master failure. Lastly, the CMGR module 12-220 includes routines for performing cluster, member and device access operations.

CLUSTER MONITOR MODULE 12-230

The CMON module 12-230 includes routines for performing a number of functions which primarily involve monitoring the state of cluster controller 14, through cluster controller driver 12-300 of FIG. 2 and communicating any changes. These routines include a get_cluster_lrn function wherein a routine returns the logical resource number (LRN) associated with the cluster controller 14 identified as "!CLUS00", a disconnect function wherein another routine enables the CMON module 12-230 to disconnect from the cluster controller 14 so that it can reconnect when the controller 14 becomes available and a connect_to function wherein the CMON module 12-230 is allowed to connect to the cluster controller 14. Once connected, CMON module 12-230 checks a status message received from cluster controller 14 to see if it is the master and whether there are other members already connected to the controller 14. If the status message indicates that it is the only active member, then it assumes it is the master. The CMON module sends a message to the CMGR module indicating whether or not it is the master.

A further routine includes a section of code which checks to see if there was more than one bit set in the cluster controller Cu_bit map information value. This can arise when a cluster member is restarted after being stopped in response to a CM -STOP command. The extra bits that get set to an active or ONE state indicate which other members are already on the cluster. By subtracting the channel bit map information value Ch_bit map from the Cu_bit map information, it turns off the active bit of the restarted member. Setting Ch_bit map=Cu_bit map sets the maps up in the way they would if they had been received in response to a get status function which is the correct form for performing an analyze_status function. It sends the appropriate messages to CMGR module 12-220 based upon the returned status received from cluster controller 14 so that the CMGR module 12-220 can determine which member is the master via the i-am-master function (see Appendix).

The CMON module 12-230 also includes routines for issuing system monitor calls to monitor call module 12-40 for performing a get status function wherein the module issues a read status call to cluster controller 14, get_and_open pipes function wherein the module opens the control pipe files 12-250 >>$$CATALOG>CM.PIPE and >>$$CATALOG>CFM.PIPE, a to_CFM function for sending a message to the CFM task via pipe file >>$$CATALOG>CFM PIPE, a CM_msg function for sending a message to the local CMGR module via the pipe file >>$$CATALOG>CM.PIPE and an analyze_status function for looking at the status received from cluster controller 14 in response to a get_status function, determining any changes and sending the appropriate messages to the CMGR task module 12-220.

DESCRIPTION OF OPERATION

Figure 4A:
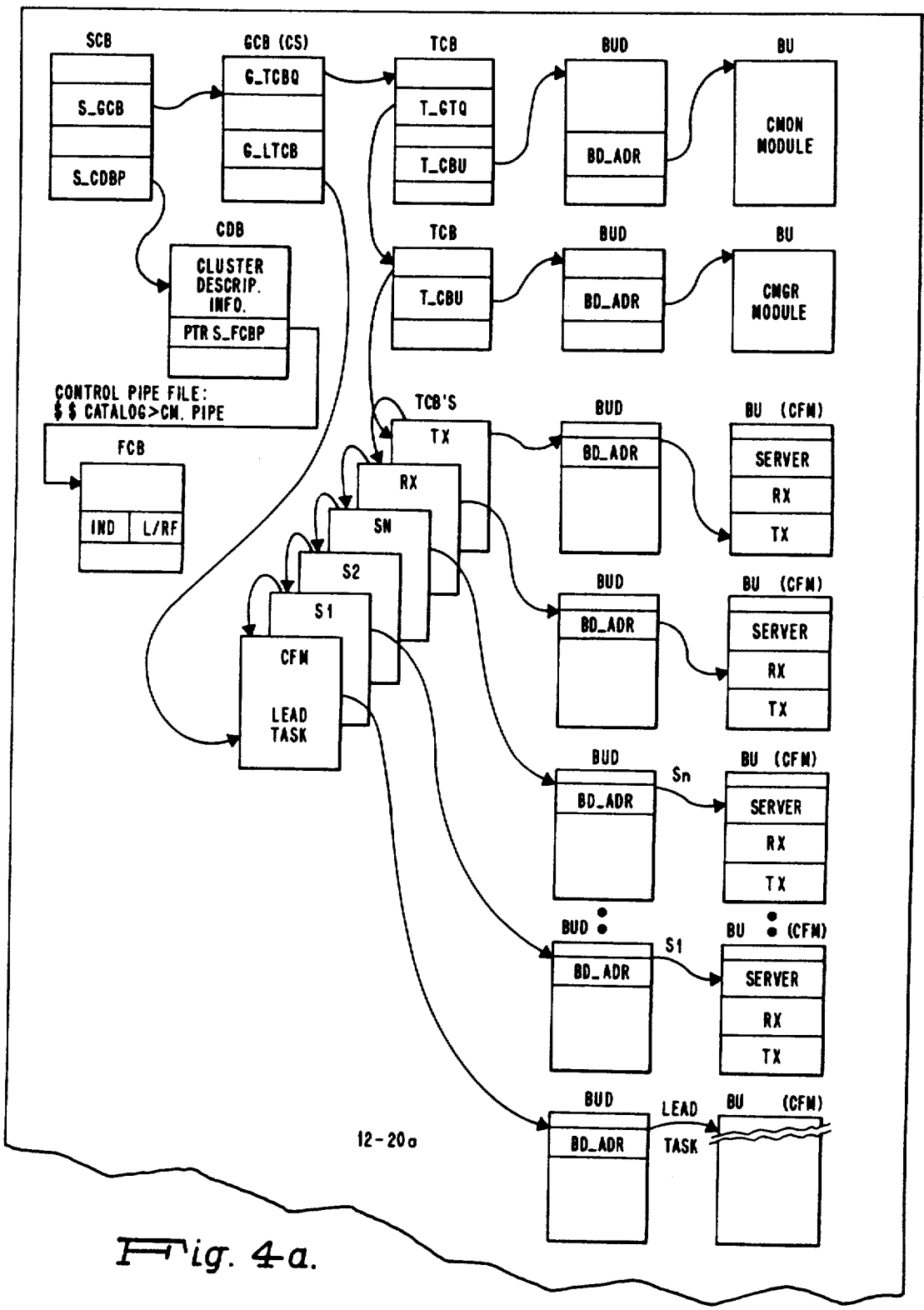
FIGS. 4a through 4f illustrate the data/control structures and operations relating to certain commands used in the system of FIG. 1.
Figure 4B:
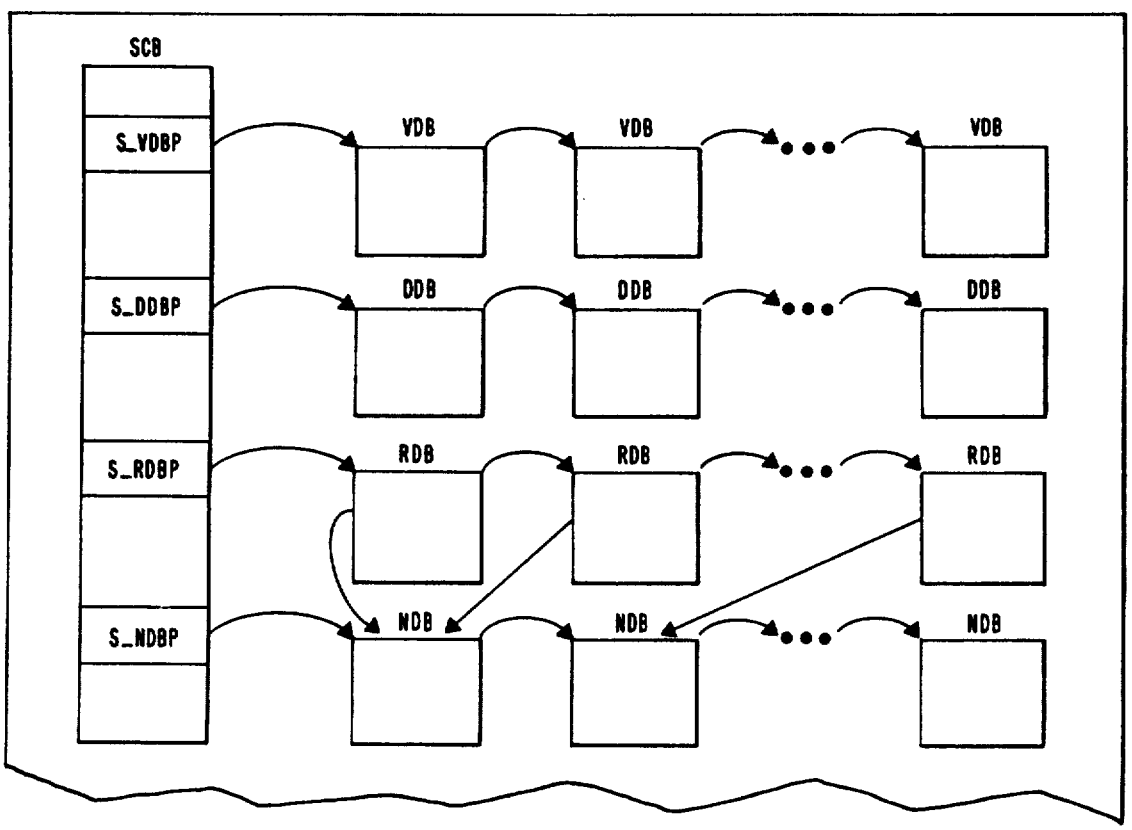
Figure 4D:
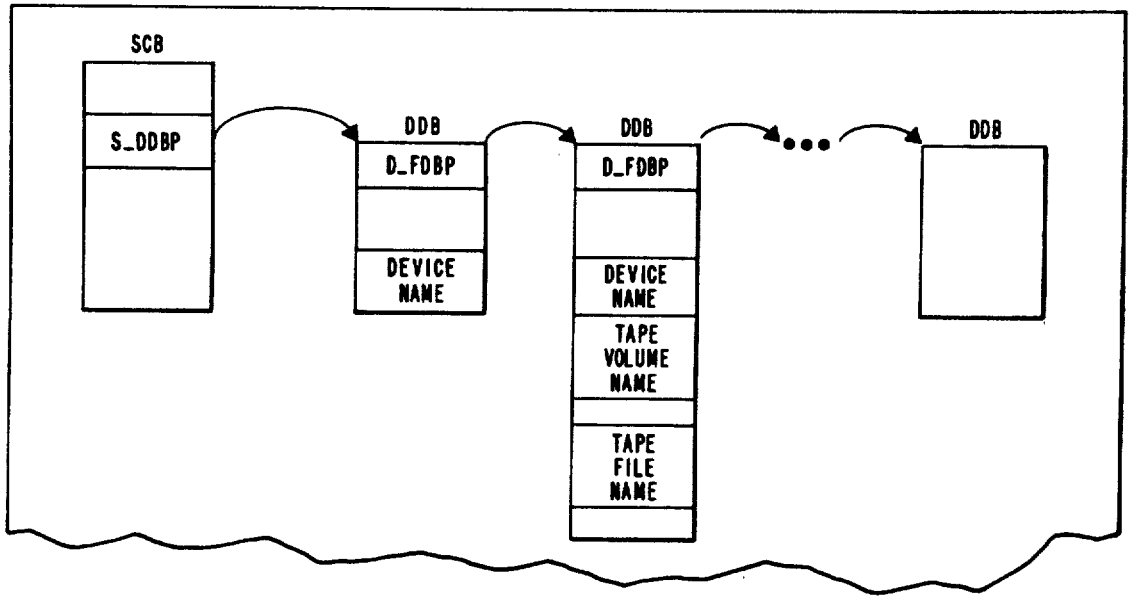
Figure 4C:
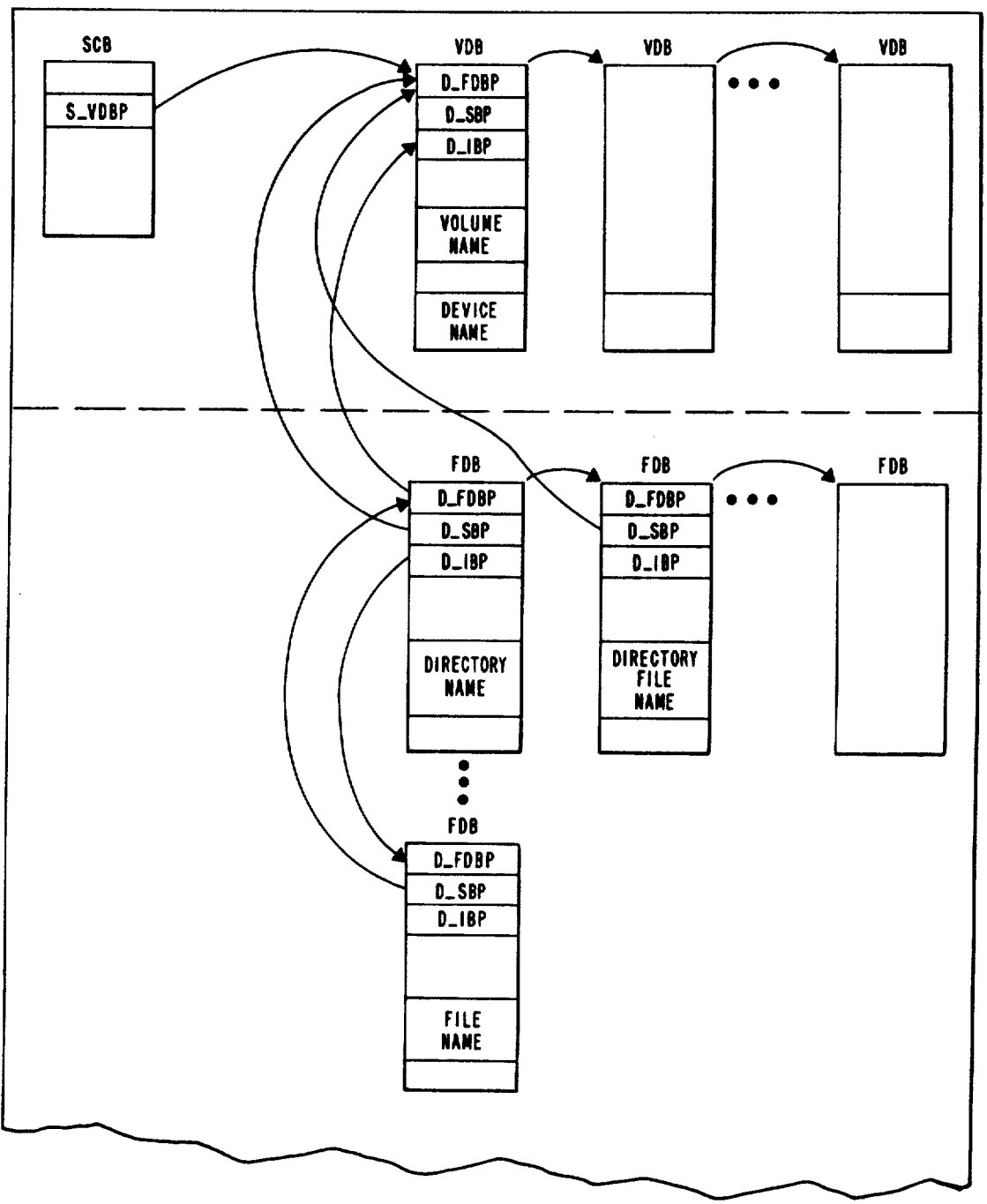
Figure 4E:
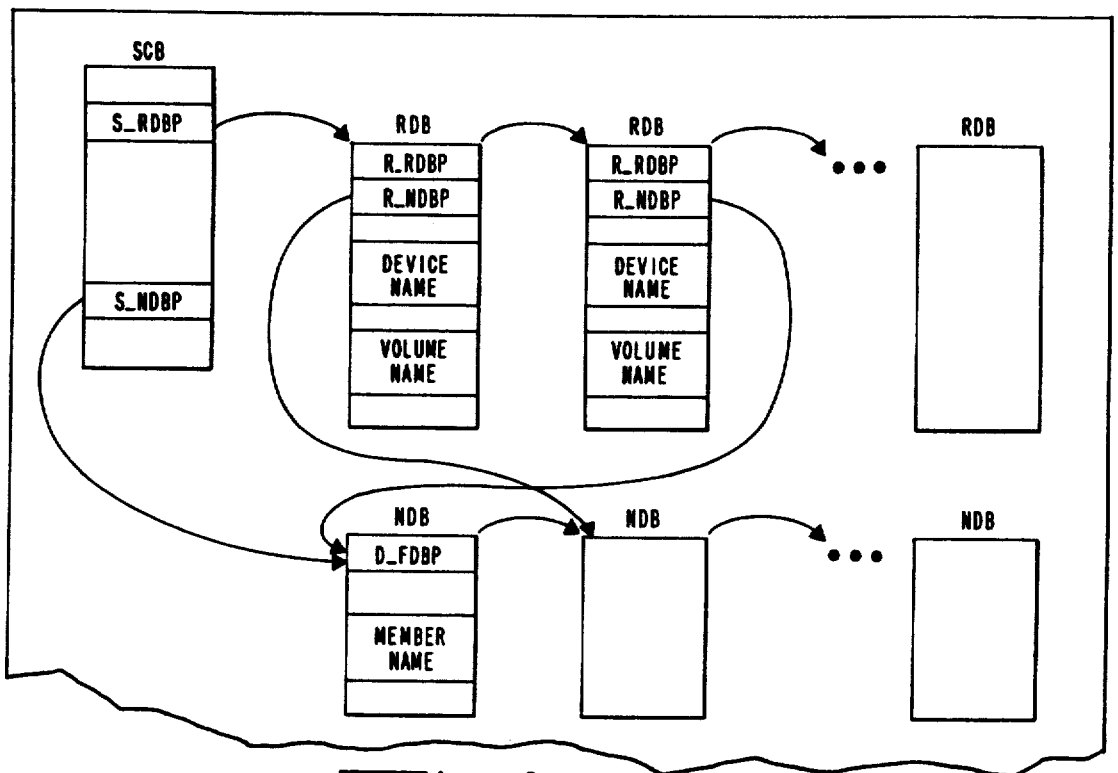
Figure 4F:
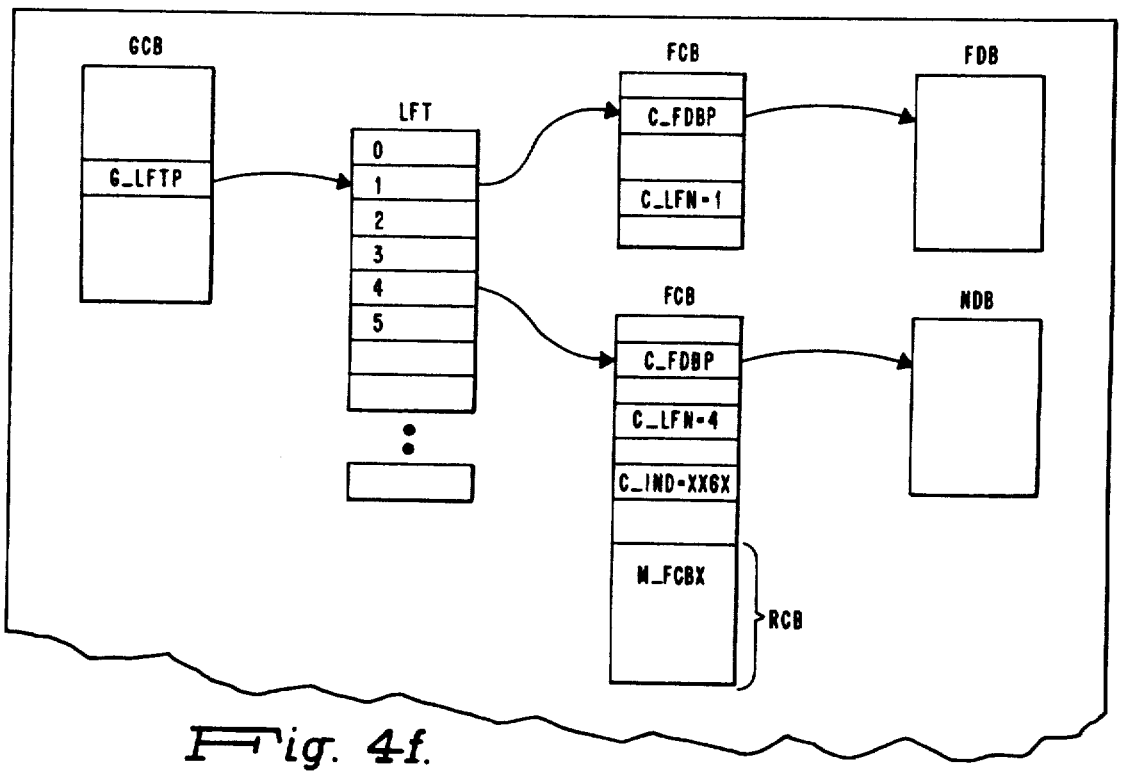
Figure 5A:
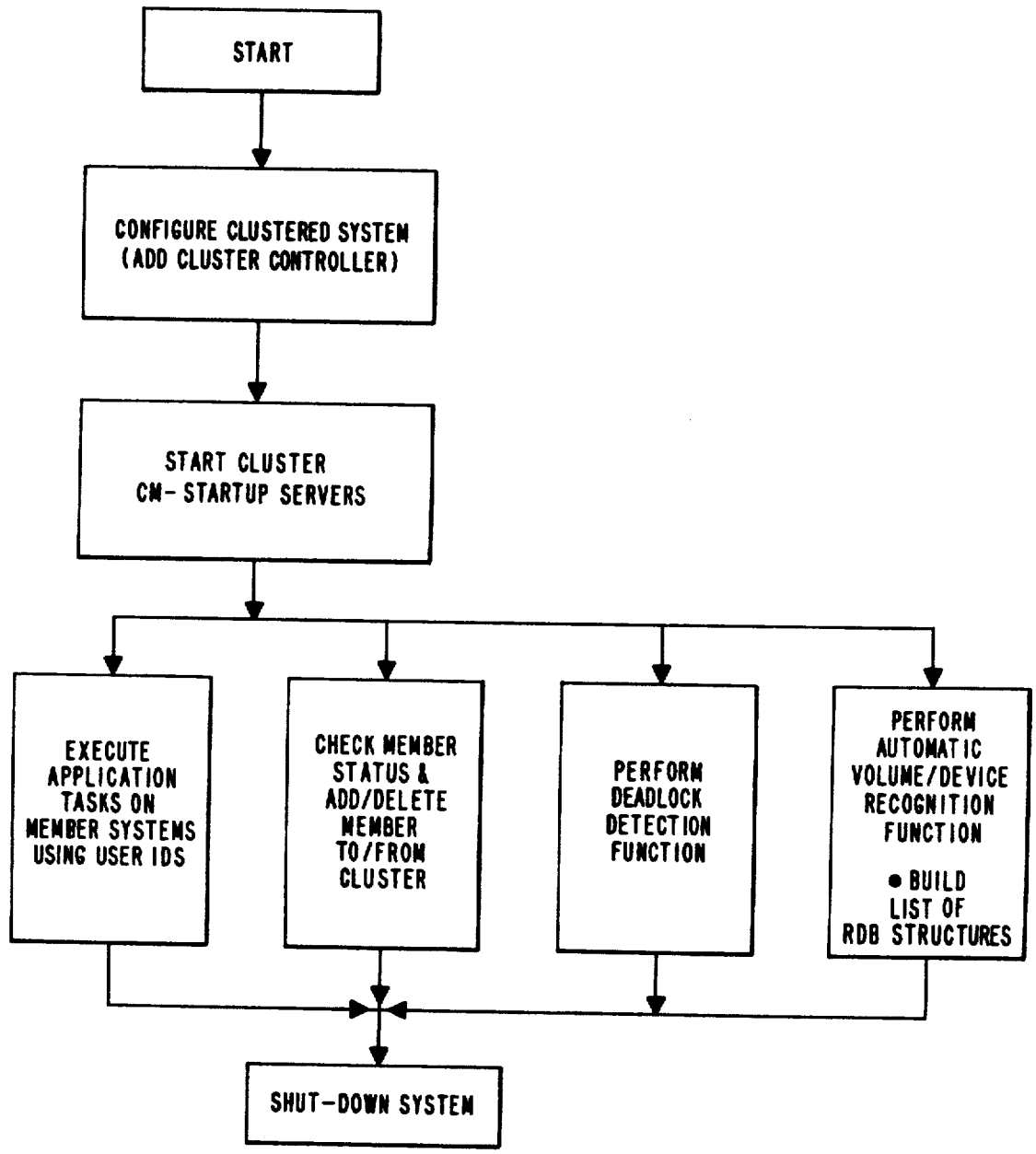
FIGS. 5a through 5d are flow charts used to explain the operation of the system of FIG. 1.

With reference to FIGS. 1 through 4f and the flow charts of FIGS. 5a and 5d, the operation of the system of FIG. 1 will now be described.

As previously discussed, the Fast RFA facility 12-200 allows user application programs in the clustered system 10 to share data stored on files, directories, volumes, magnetic tapes and printers. Devices which are physically attached to one computer system member appear to user programs running in cluster member systems as being locally attached to all of the other computer system clustered members. Since each computer system member is a separately bootable computer system with its own set of peripheral devices, the system operator or administrator can determine when to start up and stop the Fast RFA facility 12-200 and to retrieve cluster status information.

Before starting up the facility 12-200, first the cluster controller 14 and cluster driver 12-300 are configured. This is accomplished by the system operator issuing two configuration load manager (CLM) commands. One command configures the controller 14 (!CLUS00) and the second command configures/loads the cluster driver 12-300. For the purpose of the present invention, it can be assumed that the configuration is carried out in the manner similar to the configuration of other disk controller devices and drivers. More specifically, in response to a CLM command such as: DEVICE CLUS00, 36, 36, X'1000', the operating system creates the appropriate entries and control structures in the logical resource and resource control tables stored in memory 12-201 of FIG. 2.

Since the disk, tape and printer devices will be shared between all cluster system members, it is necessary that the devices be configured using names which are unique across the cluster. As mentioned, the cluster system 10 can include up to 16 system members designated by four character names which can range from MBRA to MBRP. Therefore, the devices at computer system 12a, member MBRA, normally would be configured with names like MSMA1, MSMA2 for mass storage, . . . , MT9A0, MT9A1 for 9-channel tape drives . . . , LPTA0 for line printers, etc. at computer system 12b, member MBRB with names like MSMB1, MSMB2. . . and at computer system 12c, member MBRC with names like MSMC1, MSMC2 . . . , etc.

After each system is booted and before the starting of groups, etc. which will reference devices and volumes, a cluster start-up command is issued by the operator. The start-up command has the format: CM -STARTUP [cluster_device_name] [-SERVERS n]. In response to the portion "-STARTUP [cluster_device_name]" of the start-up command, cluster manager module 12-201 initializes the Fast RFA facility 12-200, creating a cluster manager control group (CS) for cluster communications. That is, it generates the required sequence of system monitor calls to monitor call handler module 12-180 which creates a control group having a group id=CS and creates the necessary tasks to monitor the cluster and service file system MCL requests. The group id is a two character (ASCII) name that does not have a $ as its first character. The group represents those specific users, each of which is identified by a user ID which utilize the FRFA facility.

The portion "-SERVERS n" of the start-up command specifies the number of server tasks to be used to answer requests from other system members which join the cluster. This number defines the number of simultaneous file system MCL requests that can be processed by the cluster manager from the other members in the cluster. In the absence of any entry, eight server tasks are created. The execution of a start-up command results in the creation of the entries and structures illustrated in FIGS. 2 and 5d.

Figure 5B:
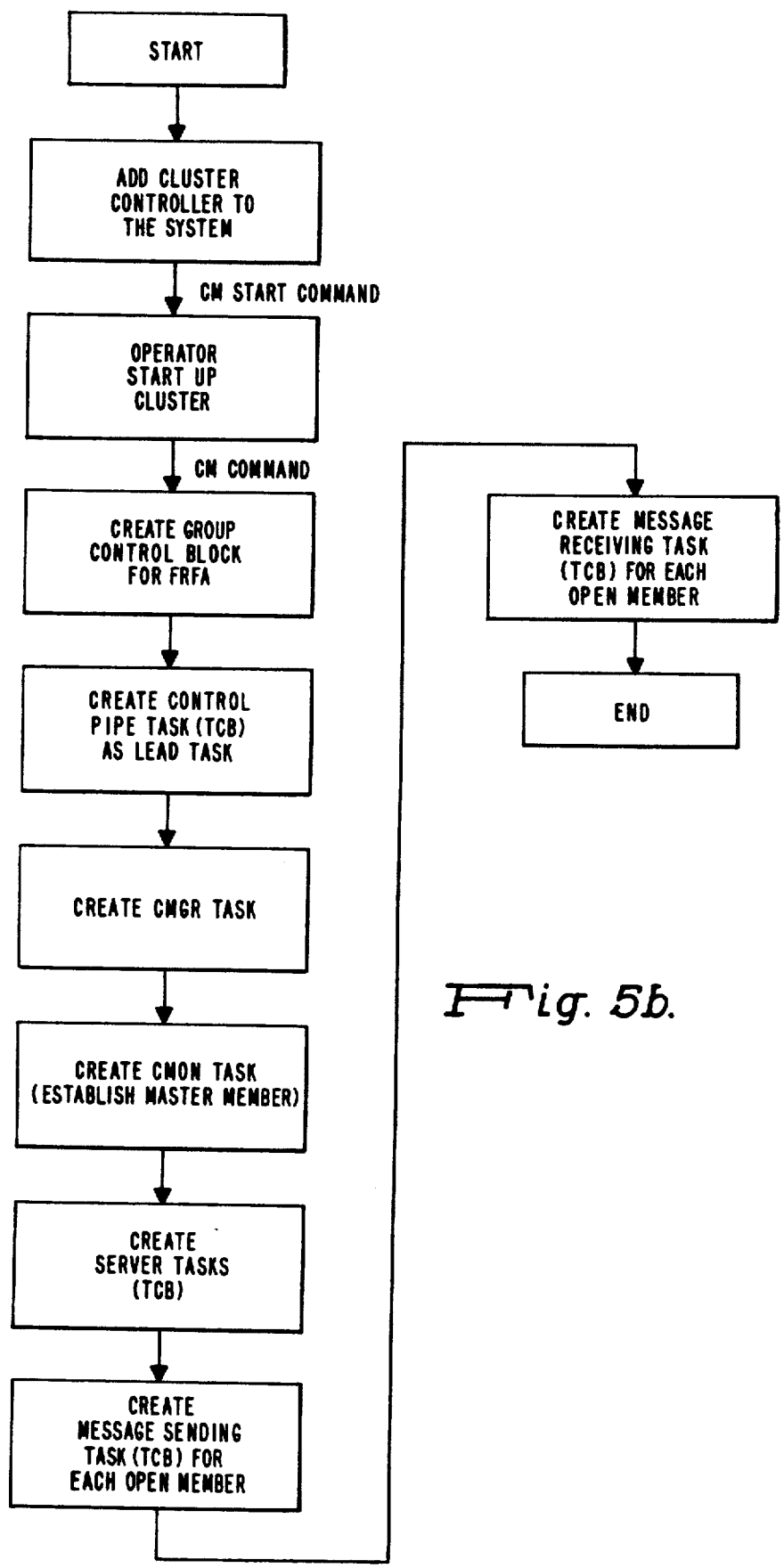
Figure 5C:
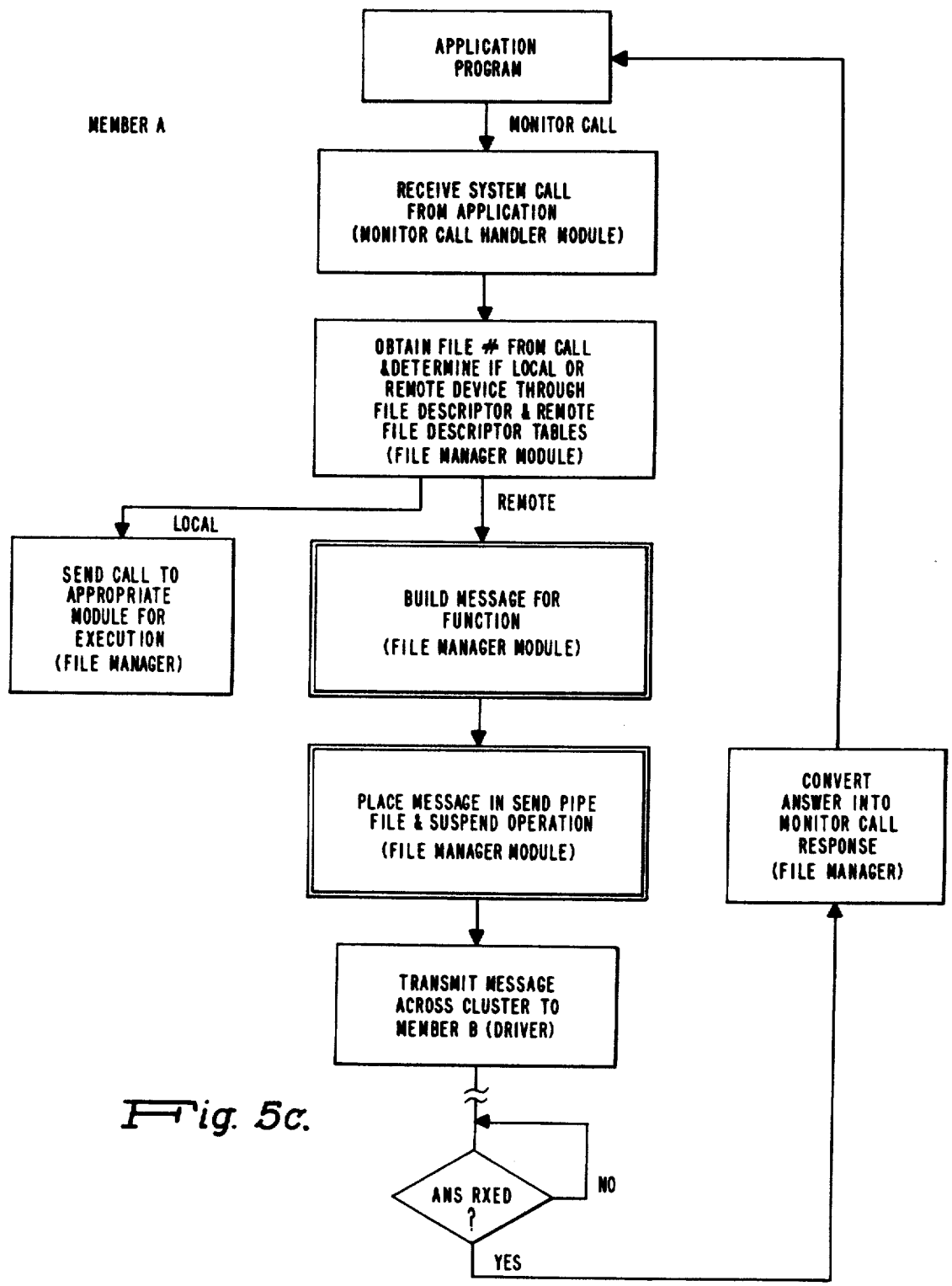

In greater detail, the cluster manager module 12-201 causes the monitor call handler module 12-140 of the operating system, in response to the CM -STARTUP command portion, to cause the performance of the series of operations shown in FIG. 5b. First, the operating system creates the "CS" group control block (GCB) of FIG. 4a in which the data structures required to define and control the execution of the group are allocated and created. Included in the GCB is information identifying the CFM lead task whose execution spawns all of the other tasks which include CFM server tasks, CFM message transporter tasks, CMGR task and CMON task as indicated in FIG. 4d. These tasks of the FRFA facility 12-200 communicate with each other and other copies of themselves on other cluster members by writing and reading messages via the file system pipe files located in >>$CATALOG. The CFM lead task receives messages from the cluster manager module 12-201 in response to the CM command, telling it how many server tasks to create (CM -SERVERS n), asking it for cluster member status (CM -STATUS) or telling it to shut down the cluster facility (CM -STOP). It also receives messages from the CMON task telling it to open or close a cluster member.

More specifically, during initialization, the CFM lead task creates the following pipe files: control pipe file >>$CATALOG>CFM.PIPE used to receive message requests from the CMGR command task and the CMON task; the pipe file >>$$CATALOG>CM.PIPE used to send open and close messages to the CMGR task; and, the server pipe file >>$$CATALOG>CFM.SERVER used to signal a server task that a server request message has been received from another member. It gets and opens the control pipe file >>$$CATALOG>CFM.PIPE.

As mentioned, the CFM lead task spawns the CMON and CMGR tasks. The CMON task is spawned with <cluster name> as an argument or if the operator does not specify a specific cluster name, then !CLUS00 is used as the default cluster name. The CMON module requires the cluster name so it can reserve the cluster and obtain its logical resource name (LRN) to connect to the cluster and issue read-cluster-status calls. The CFM task enters a command processing loop reading command directives from the control pipe file >>SSCATALOG>CFM.PIPE. These include a "SU" start-up-cluster message sent by the CMON task.

The SU start-up cluster message causes CFM module to issue a "10F8" monitor call to the file manager module 12-240 informing the operating system executive that the cluster is active. The message input information from the CMON module 12-220 is the name of the local member. The cluster id is the name of the cluster controller device 14 which, by default (if CM -START <cluster name> was not specified), is !CLUS00. This results in cluster access section of file manager module 12-240 creating the CDB data structure of FIG. 4a which enables the system to operate in cluster mode. Also, the monitor call causes the file manager module 12-240 to open control pipe file $$CATALOG>CM-.PIPE. this involves the creation of File Control Block (FCB) for reading and writing control pipe information.

The CFM module also sends a "cluster start-up complete" message to the CMGR task module via the CM.PIPE file in order to inform the CMGR module the name of the local member. The CMGR module 12-220 needs this name so that it can communicate this information with its counterparts located on other system members of the cluster.

The "SV" server message is sent by the cluster manager module 12-201 in response to the CM -SERVERS command portion. This causes the specified number of server tasks to be created. This number defines the number of remote monitor calls which can be executed simultaneously by local server tasks. The local server tasks are able to process requests from an unlimited number of remote user programs since a task in the group of server tasks is not dedicated specifically to one user program. Hence, after a server task processes a user request (e.g. read a record from a local file), it is available to process a request from another user program. The arrangement of the present invention enables the total load imposed on the server system to be controlled by the number of server tasks specified by the start command when the server group is activated.

As concerns the server tasks, as mentioned, these tasks are spawned by the CFM lead task in response to the CM -SERVERS portion of the start-up command received by cluster manager module 12-201 and receive file system monitor call messages from other cluster system members. Each of the server tasks perform the requested monitor call and package/translate the response into an appropriate response message (see appendix).

The CFM lead task performs the following operations to initialize each server task. It allocates memory for a server control block (SCB) structure and a task request block (TRB) structure for the server task. It links the SCB data structure into the chain of SCBs to be addressed via a local common procedure. It creates the server task via a create task $CRTSK monitor call. It opens the server pipe >>$$CATALOG>CFM-.SERVER, and it requests the server task via a request task $RQTSK monitor call. A server task waits to service message requests by reading signal messages from the signal pipe >>$$CATALOG>CFM.SERVER. When a request message is received by a transporter receive task then this task creates a signal message and places it into the signal pipe. This process of writing a message into the pipe wakes up the next available server task.

The CFM lead task creates a cluster transporter task CLU-DIR which as mentioned is broken up into send and receive tasks. These tasks are represented in FIG. 2 as transmit and receive task modules 12-206 and 12-204. It receives a function code indicating the operation to be performed, cluster identification (e.g., !CLUS00), member identification with which it is communicating (e.g., MBRA) and the local member name (e.g., MBRC). The CLU-DIR task performs the following operations in response to function code value=1 specifying global initialization. It allocates memory for internal transporter data structure which contains:
an external application id;
an internal application id;
a local member id;
a member id of correspondent; and,
a basic get-file-info parameter structure block PSB.

The address of the allocated memory is placed back in the input parameter passing block so it can be referenced by other functions. The external application id is a 12 character name which is formed from a character string consisting of "CLD_" followed by two 4 character member names. These are the names of the local member, as well as a specific remote member (correspondent). For example, if the local name is MBRC and it is corresponding (via this transporter task) with MBRA, then the external application id will be CLD_ MBRAMBRC. The names are sorted so that the transporter at the correspondent's member will also develop the same application id. This id is important because it is used by the cluster driver to connect this transporter with the same user application program at the corresponding site.

A get-file-info monitor call is issued to handler 12-140 using the cluster device name supplied on input, for example, !CLUS00. The purpose of this monitor call is to obtain the logical resource number (LRN) of the cluster device so that IORB requests can then be sent to the cluster driver.

A connect IORB request (function code 0A hex) is issued to the cluster driver 12-300 supplying as an input, the external application id. Normally, this connect request takes place immediately because this task was started by a notice received by the cluster monitor (CMON) module that the correspondent had joined the cluster. Of course, it is possible that the member could have failed just after joining the cluster. If the connection fails, the global memory allocated above is returned and an exit from this step is done with an error code.

During initialization, the CMGR task operates by performing the following operations. It opens the pipe ">>$$CATALOG>CM.PIPE!" for use in communicating with CMGR tasks on other members. It gets the logical resource number of the cluster device "!CLUS00", performs a "get" on the cluster device "!CLUS00", and attempts to connect to the cluster controller. Assuming it is successful, it then sends a start-up message to CFM module. The CMGR module then checks to see if it is the master member using a bit map in the manner previously discussed and sends the CFM module a message with the result. If any other members are in the cluster when it joins, it sends a mem_open message to CFM task module for each of the members.

The CMGR task operates by performing the following operations. It enables its trap handler. It initializes pathnames to pipe files used to communicate with other CMGR tasks. It attempts to open the local control pipe file ">>$$CATALOG>CMGR.PIPE" and shuts down the member if it is unable to do so, and enters a loop that causes it to alternately read its input pipe file and process the last message from that pipe file. This continues until a message is received from the local Fast RFA task running CFM task module, telling it to shut down the member.

It will be assumed that member 12a-2 is the master. Therefore, when the CMON task is started after determining that it is the master, the CMON task sends a mem_open (OP) message to the local CFM lead task when each member which has been configured to operate in cluster mode joins the cluster. As mentioned, this causes the CFM lead task to spawn a task which, in turn, spawns two transporter tasks to handle sending and receiving messages to and from the specified cluster member.

When the tasks have been spawned and have finished successfully connecting to that member, the CFM lead task issues a "10F9" monitor call to the monitor call handler module 12-240 informing the operating system that the member is open and messages can now be sent to and received from that member. The CFM lead task also sends a "member opened" message to the CMGR task via the control pipe 12-250 designated as CM.PIPE to inform it that a new member has joined the cluster. This message starts a process whereby device and volume information is exchanged between cluster members through the control pipe 12-250.

As mentioned, the CFM lead task maintains an internal data structure called node control block (NCB) for each cluster member. The NCB's are maintained in a linked list which is accessed in response to status (ST), close-all members (CA) and shutdown cluster (SD) messages. The NCB structure stores information defining the name of the cluster member, the size of the message blocks sent to and from the member, the state of the member, etc. The Appendix describes this structure in greater detail.

At the completion of the exchange process, each cluster member has stored in control table 12-260, a current list of how many members are connected in the cluster, in addition to a complete list of all the disk, tape and printer devices that can be accessed through the file manager system of module 12-240. Once the process is complete, each FRFA facility is ready to process user requests.

With reference to FIGS. 4b through 4e and 5c and 5d, the operation of the FRFA facility in processing requests will now be described. It will be assumed that a user COBOL application program is being run which specifies the opening of a file followed by record read and write. This causes the generation of standard system monitor calls to be applied to the monitor call handler module 12-240 which, in response to each call, accesses the control structure table 12-260 containing the list of available system devices and cluster members.

User Application Monitor Call Interface

The various file data control structures in FIGS. 4b through 4e will now be described. Information about a local disk device including the device name, as well as the name of the logical volume currently mounted on that device, is maintained in a volume descriptor block (VDB) structure. A chain of VDB's is provided off of the system control block (SCB.S_VDBP) as shown in FIG. 4c. This VDB chain is created during system configuration (CLM). Automatic volume recognition (AVR) software included as part of the file manager module 12-240 modifies VDB's when a disk volume is mounted or dismounted (in a conventional manner).

The HVS6 file system provides a directory tree structure within each mounted disk volume. For each file, index and directory being accessed, information is maintained in memory in a file descriptor block (FDB) structure. FDB's are organized and chained in memory in a tree structure which emanates from VDB's similar to how it is organized on disk as shown in FIG. 4c. FDB's contain the name of the file, the type of file, links to the superior and inferior directory FDB levels as well as a link to the next FDB on the same directory level. FDB's contain logical information such as record size, key locations and sizes which allow for logical record level i/o services.

In addition, an FDB describes where (at what physical sectors) the data of the file is located and also contains information necessary to request i/o services from the appropriate device driver. An FDB is created in memory as a result of a user application monitor call which reserves the file for processing and it is deleted from memory when the application removes the file. Typically, in COBOL, an FDB is created by an open-file request and deleted by a close-file request. Also, the file manager 12-240 creates a File Control Block (FCB) of FIG. 4-f which contains information relating to a specific use of the file such as a current record pointer (e.g., one instance of opening the file). The FCB is found by locating the logical file table (LFT of FIG. 4-f) linked to the group control block (GCB of FIG. 4-f). The LFT is simply an array of pointers to FCBs. The logical file number (LFN) is assigned when the file is reserved and serves as an index into the array.

For non-disk devices such as tapes, printers and terminals, a device descriptor block (DDB) structure is maintained. As shown in FIG. 4d, a DDB contains the name of the device as well as logical information such as record size. For tapes, a DDB contains the name of the volume currently mounted on the device and the name of the file currently being accessed. A DDB is modified by AVR software whenever a tape is mounted or dismounted. A DDB also contains the physical information necessary to request i/o services from the appropriate device driver. A chain of DDB's is provided off of the system control block (SCB.S_DDBP). This DDB chain is also created during system configuration via a configuration load manager (CLM).

For remote devices, a remote device descriptor block (RDB) structure is maintained. As shown in FIG. 4e, an RDB contains the name of the remote device, the type of device, the name of the volume currently mounted there and a link to a node descriptor block (NDB) structure of the cluster member where the device is located. An RDB chain is maintained off of the system control block (SCB.S_RDBP). Entries in this chain are created when members join the cluster and exchange a list of all volumes and devices. In addition, when a volume is mounted or dismounted at a remote site, the AVR software at that site communicates with all other members in the cluster to update their RDBs. For further information regarding some of these structures, reference may be made to the publications entitled, "HVS6 PLUS System Concepts," Order No. HE03-01 and "HVS6 PLUS Data File Organizations and Formats," Order No. LH29-00.

In response to the open file request, the monitor call handler module 12-240 accesses the appropriate file descriptor block (FDB) in control structure table 12-260 in a conventional manner (see FIG. 4c). As explained herein, it finds that the file to be opened does not reside locally but actually resides on another system, module 12-240 builds a message having a predetermined format compatible with the protocol used by the cluster driver 12-300 (see message section of appendix). The message is then loaded in the queue of send pipe file module 12-254 and the file manager 12-240 then attempts to read the response from the queue of receive pipe module 12-252. Reading from the receive pipe file module 12-252 causes the file manager 12-240 to suspend operation until the response is available.

Note that many user applications at the same time can be accessing data at the same remote site. Multiple request messages may have been placed in the same request queue of send pipe file module 12-254 and many applications executing within the file manager 12-240 may be waiting for different response messages from the answer queue of receive pipe file module 12-252. When a request message is built, the file manager 12-240 places within this message a record type field which uniquely identifies the request.

It will be assumed that the file being opened resides on member B. Upon the send task module 12-202 of member A system detecting that a request has been loaded into its queue, it then sends the message via cluster driver 12-300 through cluster controller 14 to the member B system 12b. As seen from FIG. 5d, receive task module 12-204 of member B is waiting for requests. It stores the cluster message in the request queue of receive pipe file module 12-252 of member B. Next, a server task waiting for requests is awakened and examines the message. Upon determining that the message is a file system call to open a file, the server task module 12-208 of member B converts the message into the format of a standard system monitor call (see appendix). This call, when received by the monitor call handler module 12-240 of member B, is then issued via a local driver 12-108 to the designated device.

Figure 5D:
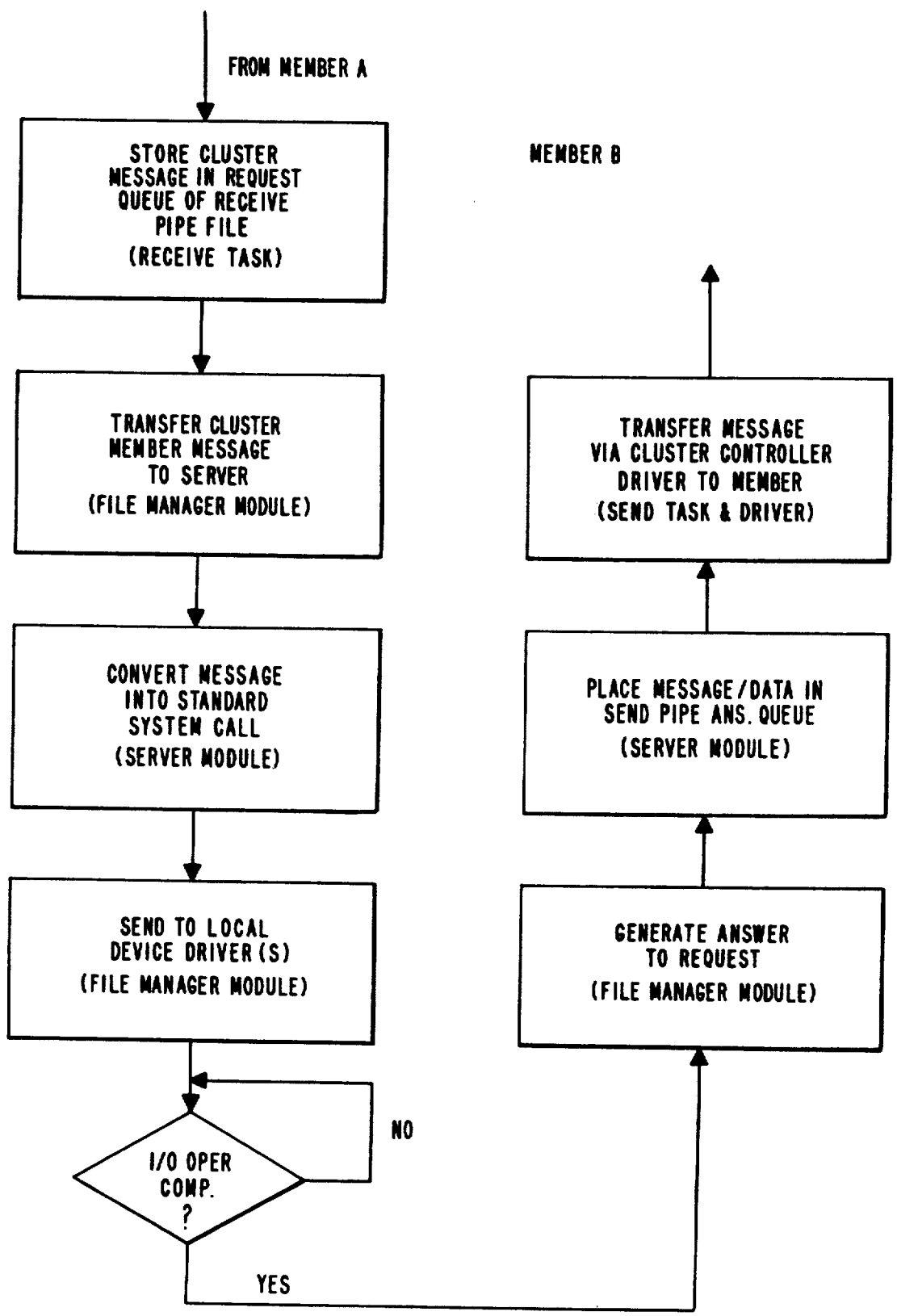

As seen from FIG. 5d, when the I/O operation has been completed by the device of member B, an interrupt is generated in a conventional manner. The interrupt is processed by cluster member system 12b which results in an appropriate message including any requested data being placed in the answer queue of the send pipe module 12-254 of member B. Included in this response message is the record type generated in member A which uniquely identifies the service request. The send task module 12-202 of member B is woken up and responds by sending the message back to member A system 12a via cluster driver 12-300 and cluster controller 14.

Upon receipt of the message from member B, receive task module 12-204 of member A system 12a stores the message in the receive answer queue of receive pipe file module 12-252. The record type, received in the response message, allows the receive pipe file module 12-252 to awaken only the application program which is waiting for this particular response. As seen from FIG. 5c, the monitor call file manager, upon receipt of the answer message from member B via the answer queue of receive pipe file 12-252, operates to convert the answer message into a monitor call response. The response is returned to the application program in a conventional manner. At that time, the user process is awakened for receipt of the response. The user application program will continue to issue file system monitor calls.

The above will now be considered in greater detail. When a user application program issues a file system monitor call it passes a parameter structure which identifies the file it is accessing by specifying either a pathname to the file or a logical file number (LFN). If the application program specifies an LFN, then it is indirectly specifying a pathname since previously the LFN was connected to that pathname via other file system monitor calls or commands which associate a pathname to an LFN (ASSOC command), reserve a file (GET command) or create a file (CR command).

When a pathname or LFN is specified via the user application program monitor call, then the file manager 12-240 searches the system VDB, DDB and RDB chains to locate the device or volume specified in the pathname. If a name match occurs searching in the VDB or DDB chain, then the request proceeds through the file manager components of module 12-240 in a conventional manner for a local peripheral device.

If a name match occurs while searching in the RDB chain, then it is known that this user application monitor call is requesting a service from a remote volume or device. Then, the file manager 12-240 replaces the conventional FCB with a special FCB that is expanded to include a Remote Control block (RCB of FIG. 4-f). The RCB contains information needed to build the messages sent to the cluster access portion of the file manager module 12-240 of FIG. 2. The RCB has a pointer to the RDB of the cluster member where the file is physically located (FIG. 4-f). A bit (MC_RFA) in the FCB indicator word (C_IND) is set to a binary 1 to indicate that the FCB is referencing a remote file and is a special FCB that includes an RCB. By simply testing this indicator, the file manager 12-240 can quickly determine that the request must be processed by the cluster access section in response to any subsequent monitor calls using the same LFN.

The monitor call module 12-240 then creates a message which contains the user application identity as well as all the data and information structures passed by the application via the monitor call. For example, in the case of a write-record monitor call request, the message contains the user identity, the monitor call number (11xx), the parameter structure (called a File Information Block) identifying the LFN, location, size, key and type of record to be written as well as the actual data to be transferred (see appendix). As indicated, the RCB, NDB, and RDB contain information so that this message can be sent to a server at that remote site, serviced over there and an appropriate response sent back.

There are two key points to be noted. First, that the message represents a service to be performed at the user application level. For example, a read-via-key monitor call to an index or data base is sent to the remote site and executed over there. This single monitor call and single message may represent a significant amount of i/o to be performed locally at that remote site as index levels, data file and overflow areas are searched. The service is not performed at a lower level, for example, at the device driver level, where a significant amount of data often would be needed to be passed between the sites to complete the request. File data is not cached or buffered at more than one site and thus there are not the complexities of keeping it in synchronization.

Second, that the service is performed so that the user application is not aware that it is being done by a remote member. The remote member server fully represents the user, so that security information, statistics and file information are maintained exactly as if the user application and file data were located on the same member. A user application can access local data and then, without modification, the data can be moved to a remote member. Utilities and services which create, delete, expand, shrink, rename, modify, list, dump, copy, print, compare, sort, compile, edit document, save, restore, etc. local data can also be used against remote member data.

Figure 3:
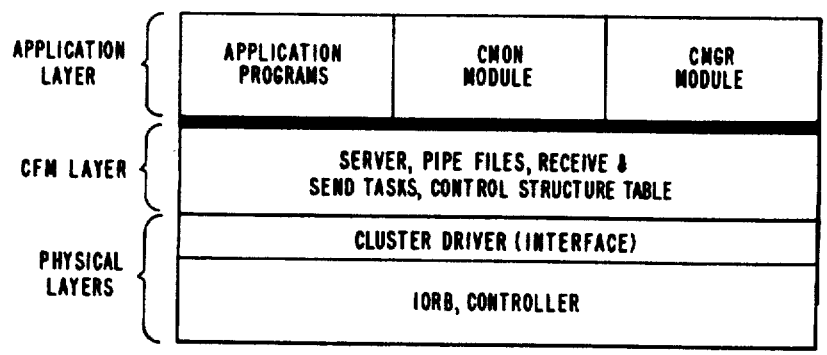
FIG. 3 illustrates the layer organizational structure of the present invention.

From the perspective of the user application program, the file appeared as if it was attached to the member A system. All of the activity which took place was at a level or layer below the user application level as illustrated in FIG. 3. This layering has the important advantage of requiring no changes to existing user application programs or existing system utilities. As shown a single intermediate or middle layer is assigned the sole function of cluster file management which simplifies system control, reduces complexity and increases flexibility.

With the same degree of ease, member systems can discontinue operating in cluster mode. For example, when it is decided to stop member A from operating as part of the cluster, the operator need only to issue a CM-STOP command to the cluster manager module 12-201 of member B via terminal 12b-6. When the shutdown command is received, the cluster manager module 12-201 sends a monitor call to the monitor call handler module 12-140 which results in a shutdown message being sent to the CFM control pipe file 12-250 via the file manager module 12-240. The cluster manager module 12-201 takes the shutdown message from the CFM control pipe file 12-250.

In response to the shut down message, cluster manager module 12-201 acknowledges receipt of the message by sending a reply to the CM task created to carry out the shut down process. Just as in the case of the start-up command, a temporary task is created to perform the shutdown function and upon completion is eliminated. That is, when CM task receives the acknowledgement message, it is terminated and deleted.

In response to the above, the cluster manager module 12-201 performs the following operations. It closes the command file corresponding to one of the control pipe files 12-250. Also, it closes the CMGR task module request pipe corresponding to another one of the control pipe files 12-250. Next, it stops the server tasks corresponding to server task module 12-208. This is accomplished by sending each such server task a message specifying to stop operation. Next, it stops the transporter tasks corresponding to modules 12-204 and 12-206. This is followed by deletion of the semaphore structures. The cluster manager module 12-201 next issues a close cluster monitor call MCL10F8 to monitor call handler module 12-140. This results in the display of a shutdown message at terminal 12b-6 and aborting the task control group. The abort task group results in the elimination or deletion of all of the tasks created by the the start command shown in FIG. 4a.

For futher information regarding the above, reference may be made to the Appendix.

From the foregoing, it is seen how the present invention enables a multicomputer system to operate in a cluster environment invoked through a single command. When so operated, any application program running on any computer system is able to access peripheral devices of another computer system which has been enabled for cluster operation.

Also, the present invention maximizes use of existing operating system modules and through the use of a simple master determination function minimizes the exchange of messages and the updating of AVR tables, etc. That is, when the system is initially started up, the first system enabled for cluster mode operation is deemed the "master." This system remains the "master" until a system member leaves the cluster. At that time, the master determination function determines a new master in the manner previously described.

APPENDIX

I. CFM Messages

1. "SU" start-up-cluster message sent by the CMON task: This causes the CFM lead task to issue a "10F8" monitor call to inform the executive that the cluster is active. Input from the CMON task is the name of the local member and the member number. The cluster id is the name of the cluster device which, by default (if CM -START <cluster name> was not specified), is !CLUS00. The CFM task also sends a "cluster start-up complete" message to the CMGR task (via CM.PIPE) in order to inform the CMGR task the name of the local member. The CMGR task uses this name to communicate this information with its counterpart on other members of the cluster.

"SV" server message is sent in response to the CM - SERVERS command portion: This causes the specified number of server tasks to be created. This number defines the number of remote monitor calls which can be executed at the same time by local server tasks.

"OP" open-member message is sent by the CMON task when it detects that a new member has joined the cluster. This causes the CFM lead task to spawn a task which, in turn, will spawn two transporter tasks to handle sending messages to and receiving messages from the specified member. When these tasks have been spawned and have finished successfully connecting to that member, then the CFM lead task issues a "10F9" monitor call to inform the operating system executive that the member is open and messages can now be sent to and received from that cluster member. The CFM lead task also sends a "member opened" message to the CMGR task via CM.PIPE file to inform it that a new member has joined the cluster. This message starts the process whereby device and volume information is exchanged between members of the cluster. The CFM lead task maintains an internal data structure called an NCB (Node Control Block) for each open node or member. The NCBs are maintained in a linked list which is used by the status function, the close-all-members function and the shutdown-cluster function.

4. The "CL" close-member message is sent by the CMON task after it detects that a member has left the cluster: This message causes the CFM task to shutdown the transporter tasks for the specified member. The CFM task then issues a 1009 monitor call to reset the user id's for all server tasks which are representing remote users located at that member. This MCL is very important since it causes rollback/recovery of files opened from that site thus providing the file consistency and integrity necessary in a distributed transaction environment. The CFM task also issues a "10F9" monitor call to inform the executive that the member is closed. This MCL call wakes up any local users (applications) who are waiting for responses with an 0271 "node/member not open" error code. It will also deconfigure devices and volumes attached to that member. This prevents the use of the files at that member until either the member rejoins the cluster or the volumes are moved to another active member. The CFM also sends a "member closed" message to the CMGR task via CM.PIPE control file informing it that the member has left the cluster.

5. The "CA" close-all-members message is sent by the CMON task after it has detected a cluster controller unavailable error. This message, in effect, causes the CFM task to do what it does for a "CL" close-member message to each active (currently open) member.

6. The "SD" shutdown-cluster message is sent by the cluster module as a result of a CM -STOP command to shutdown the cluster facility. This message causes the CFM task to enter its termination step. During termination, the CFM task performs the following functions: removes the cluster device reserved by the CMON task when it started up; closes the CFM input pipe (>>$$CATALOG>CFM.PIPE); closes the CMGR input pipe (>>$$CATALOG>CM.PIPE); stops all server tasks; closes down all active members (performs the equivalent of a "CA" message described above); issues a 10F8 monitor call to inform the executive that the cluster is no longer active; displays the CFM shutdown message; and terminates via an "abort issuing task group" monitor call.

II. Description of Internal Data Structures in HVS Assembly Language a. The format of a CFM input message:

```
cf_fun    equ   0            function code:
                             "OP" = open a member
                                    (from CMON)
                             "CL" = close a member
                                    (from CMON)
                             "CA" = close all members
                                    (from CMON)
                             "SD" = shutdown (from CM
                                    -STOP)
                             "SU" = startup (from
                                    CMON)
                             "ST" = return status
                                    (from CM -LS)
                             "TR" = trace facility
                                    (from CM -ECHO)
cf_sts    equ   cf_fun+1     return status
cf_typ    equ   cf_sts+1     reply record type
cf_ind    equ   cf_typ+1     indicator word:
                             8000 = member is open
                             4000 = member is being
                                    opened
                             2000 = member is being
                                    closed
                             1000 = member is local
``` b. For Open/Close/Status functions:

```
cf_nme    equ   cf_ind+1    member name
cf_rfu    equ   cf_nme+2    RFU
cf_lmn    equ   cf_rfu+9    logical member number
cf_bks    equ   cf_lmn+1    message   block/transfer
                            size
cf_snd    equ   cf_bks+1    pathname   of    message
                            sending pipe
cf_rcv    equ   cf_snd+29   pathname   of    message
                            receiving pipe
cf_bu     equ   cf_rcv+29   transporter BU name
cf_nbf    equ   cf_bu+6     number of buffers
cf_aid    equ   cf_nbf+1    substitute account id
cf_rf2    equ   cf_aid+6    RFU
``` c. For Servers function:

```
cf_srv    equ   cf_ind+1    number of server tasks
``` d. A Node Control Block (NCB) is created by the CFM task when a message is received from the CMGR task indicating that a new member has joined the cluster. Its purpose is to define a cluster member, the name of the member, the size of message blocks sent to and from that member, the state of the member, etc. NCBs are linked together off of local common and are displayed via the CM -LS argument. TRBs for transporter tasks exist just following the NCB.

```
n_psb     equ   0           "NCB:"
n_next    equ   n_psb+2     -> next NCB
n_prev    equ   n_next+2    -> previous NCB
n_ind     equ   n_prev+2    indicators word:
                            8000 1=in process of
                                    being
                                 0=is
```

|         |     |           |                                              |
|---------|-----|-----------|----------------------------------------------|
|         |     |           | 4000  1=opened                               |
|         |     |           |       0=closed                               |
| n_nme   | equ | n_ind+1   | node/member name (ex. "MBRA")                |
| n_ind2  | equ | n_nme+7   | 2nd indicators word (RFU)                    |
| n_dtm   | equ | n_ind2+1  | date-time last modified                      |
| n_lmn   | equ | n_dtm+3   | logical member number                        |
| n_bks   | equ | n_lmn+1   | message block/transfer size                  |
| n_snd   | equ | n_bks+1   | pathname of message sending pipe             |
| n_rcv   | equ | n_snd+29  | pathname of message receiving pipe           |
| n_bu    | equ | n_rcv+29  | BU name for message transporter              |
| n_nbf   | equ | n_bu+6    | number of buffers for server group           |
| n_aid   | equ | n_nbf+1   | substitute account id: security              |
| n_rfu   | equ | n_aid+6   | RFU                                          |
| n_trbn  | equ | n_rfu+44  | number of TRBs                               |
| n_trbw  | equ | n_trbn+1  | TRB wait list                                |
| n_trbs  | equ | n_trbw+1  | -> sender's TRB                              |
| n_trbr  | equ | n_trbw+2  | -> receiver's TRB                            |
| n_sz    | equ | n_trbr+2  |  size of NCB                             | e.  A Server Control Block (SCB) is created by the CFM task to represent a single server task. The TRB for the server task exists just following the SCB. SCBs are linked together so that at shutdown time we can terminate all the server tasks. Additional SCBs are created as needed when a new request is entered for more server tasks (ex. CM -SERVERS 4 creates 4 additional server tasks). The start of the chain of SCBs is kept in local common memory.

|       |     |   |         |
|-------|-----|---|---------|
| q_psb | equ | 0 | "SCB:"  |

```
q_next    equ    q_psb+2      -> next SCB
q_prev    equ    q_next+2     -> previous SCB
q_ind     equ    q_prev+2     indicators word
q_echo    equ    q_ind+1      -> Echo Control Block
q_sz      equ    q_echo+2     ** size of SCB **
``` f.  A Transporter Buffer Pool (TBP) is created by the receiver side of a transporter. Messages received from a remote system are read directly into one of these buffers. If there are enough buffers available, then another buffer is selected from the pool to receive the next message and the previous buffer is processed directly by a server task. If there are not enough buffers available, then the message received is written into the receive pipe (>>$$CATALOG><member__id>.RCV) and the buffer is reused to receive the next message.

```
pl_psb    equ    0                "TBP:"
pl_num    equ    pl_psb+2         number of buffers
pl_que    equ    pl_num+1         queue of free buffers
pl_frm    equ    pl_que+1+2+$AF   ** buffer frames **

* a buffer pointer frame:
pf_bsz    equ    0                block size
pf_nxt    equ    pf_bks+1         -> next frame
pf_buf    equ    pf_buf+2         -> buffer
```

III. CFM Server Tasks

A CFM server operates by executing the following steps:

1.  Get a service request: a signal message is read from the server pipe >$$CATALOG>CFM.SERVER.

The type field in the signal message (C__TYP) indicates whether the message can be accessed directly in memory or must be read from a message receiving pipe (>>$$CATALOG><member__id>.RCV). If it can be accessed directly, its address is contained in C__BUFP of the signal message. If it cannot be addressed directly, then it is normally read into the message buffer area. Note that the signal message contains the size of the entire message which possibly could consist of many blocks. In the case where the message is contained in many blocks, then memory is allocated to perform this request.

2. Perform the service request: Having read all the message blocks into memory, pointers in the message (for example, the record area in a read-record request) are reconstructed from offsets within the message and a special MCL (100A hex) is executed which performs three functions via imbedded MCLs:

A) represents the remote user: The task assumes the user id of the requestor via 1001 MCL. This id was sent as part of the message header. This function attaches the task to the currencies, LFNs, etc. already allocated in this computer to represent this user. Thus, for example, a "read-next-record" data management request can truly access the next record via the specified LFN because that LFN was reserved and opened and accessed via a previous request which also represented this user. The user ID is unique -- it includes node/member id, group id, task id, as well as the external user id (person.account.mode).

B) executes the MCL function (e.g. read next record): This MCL number was also sent as part of the message header.

C) resets the user id to the server via the MCL

1001; this allows the task to access local server pipes, echo pipes, etc.

3. Send a reply back to the requestor: The pointers in the message request, converted from offsets, are now converted back into offsets. The return status from the MCL is placed in the message header and the request is written back into the requestor's message sending pipe (>>$$CATALOG><member_id>.SND). If buffer space was allocated to perform the request, it is now returned.

4. Return to step 2) to get the next server request. Note that many separate tasks can be trying to read service requests at the same time.

5. Termination: When an end-of-file status is returned from step 2), then the server task terminates.

IV. CLU-DIR Task

1. Function Code 2: Sender Initialization

The sender task, in its initialization phase, sets up its write IORB with the proper 01 hex function code, allocates memory to be used as a buffer (the size of which is the input block size) and places the address of this buffer into the IORB.

2. Function Code 3: Receiver Initialization

The receiver task, in its initialization phase, sets up its read IORB with the proper 02 hex function code, and calls the ZUCRBP function to create a buffer pool to be used for read operations.

3. Function Code 4: Sender

This is the main loop of the sender task. it first displays a "sender has started" message and then enters a sender loop which:

A) Reads a message to be sent via ZUREAD. This can be a request for some service at the correspondent or a response to a service performed for the correspondent. The transporter sender task has no knowledge of the type of message it is sending.

B) Sends the message just read to the correspondent by issuing an IORB request which contains the appropriate "remote member id."

C) Goes back to A) above unless an error occurs in which case it returns, effectively terminating the requested task.

4. Function Code 5: Receiver

This is the main loop of the receiver task. It first displays a "receiver has started" message and then enters a receiver loop which:

A) Receives a message from the correspondent by issuing a "read" IORB request which includes the appropriate "remote member id."

B) Writes the message into a <member_name>.SND pipe by calling a write routine. If the message is a response message, then ZUWRIT will write it directly into this pipe. If the message is a request and will fit in an available message buffer, then it is not written into the pipe but instead passed via memory to a waiting server task. In any case, if the message is a service request (i.e., not a response), then a special signal message is placed in the CFM.SERVER signal pipe, in order to wake up a waiting server task. The server task will then determine whether to read the message from the <member_name>.RCV pipe or to access it directly in memory.

goes back to A) above unless an error occurs in A) or B) above.

5. Function Code 6: Sender Termination

Places an 05 hex function code into its "write" IORB and issues the "disconnect" IORB request. It then loads the buffer address from the IORB and returns this memory (4096 KB). It then displays a "sender has terminated" message.

6. Function Code 7: Receiver Termination

Places an 05 hex function code into its "read" IORB and issues this "disconnect" request. It then calls ZUDLBP to delete the buffer pool used during read operations. Finally, it displays a "receiver has terminated" message.

7. Function Code 8: Global Termination

Returns the memory for the internal transporter data structures which was allocated during global initialization function.

V. CMON Task

1. The CMON task waits for a status change from the cluster controller and analyzes the status changes. If a new member joins the cluster, it sends a mem__open message to the CFM task. If a member, leaves the cluster, it executes a monitor call to deconfigure that member from the cluster and then sends a mem__close message to the CFM task. If at any time the controller becomes unavailable, the CMON task disconnects from the controller and attempts to reconnect every five seconds. The CMON task does not terminate under normal conditions until its task is terminated by the CFM task when the Fast RFA group is shutdown.

2. CMON Subcomponet Description a. Function: get_cluster_lrn
       Purpose : This function returns the logical resource number associated with the cluster controller "!CLUS00".
       Inputs : none
       Outputs : none b. Function: disconnect_DIRAM
       Purpose : This function allows the CMON task to disconnect from the cluster controller, so that it may try to reconnect when the controller becomes unavailable.
       Inputs : none
       Outputs : none c. Function: connect_to_DIRAM
       Purpose : This function allows the CMON task to connect to the cluster controller. Once connected, it checks the status returned from the controller to see if it is the master and whether there are other members already connected to the controller. It sends the appropriate messages to the CMGR task.

Inputs : none
    Outputs : none d. Function: get_a_DIRAM
    Purpose : This function allows the CMON task to do a get on the device "!CLUS00".
    Inputs : none
    Outputs : none e. Function: get_status
    Purpose : This function issues a read status call to the cluster controller. Depending upon the situation, the call will either be made synchronously or asynchronously.
    Inputs : none
    Outputs : none f. Function: get_and_open_pipes
    Purpose : This function gets and opens the pipe files ">>$$CATALOG>CM.PIPE" and ">>$$CATALOG>CFM.PIPE".
    Inputs : none
    Outputs : none g. Function: to_CFM
    Purpose : This function is used to send a message to the CFM task via >>$$CATALOG>CFM.PIPE.
    Inputs : msg - message to be sent to the CFM task
    Outputs : none h.  Function: CM_msg
    Purpose : This function is used to send
    messages, via ">>$$CATALOG>CM.PIPE"
    to the local CMGR task.
    Inputs : msg__typ - the type of message being
    sent
    mem__num - the member number being
    referred to in the message.
    Outputs : none i.  Function: analyze_status
    Purpose : This function looks at the status
    received by get status and figures
    out what has changed since the last
    time status was returned. It sends
    the appropriate messages to CMGR
    task.
    Inputs : none
    Outputs : none j.  Function: trap_handler
    Purpose : This function catches any trap that
    is signalled to this program and
    terminates it, no matter what the
    trap. it is here mostly so that the
    "Unclaimed signal trap" message will
    not be put out by C if this program
    is unable to terminate before the
    CFM task aborts the group.
    Inputs : sig - unique number of the trap that
    has been signalled
    Outputs : none

VI. CMGR Task

The CMGR task may receive the following types of messages from the CMON task:

1. startup - tells the CMGR task its member name and number in the cluster. Also causes it to send two messages to CFM: startup and create servers.

2. im__master - tells the CMGR task whether it is the master member of the cluster after it first connects.

3. mem__close - tells the CMGR task that a member that was previously active in the cluster is no longer active. It notes this fact by turning off the associated bit in its bitmap of currently active members. The CMGR task then determines whether the member that is no longer active was the master member and, if so, whether it should become the new master member.

4. mem__open - causes the CMGR task to add the new member to its bitmap of open members.

5. shutdown - causes the CMGR task to send messages to the CFM task telling it to locally close down access to each of the other cluster members and to then close down itself. This message is received when the CMON task experiences some kind of fatal error.

6. restart - this message is received when the CMON task has received a "Controller unavailable" error and is currently trying to reconnect to the controller. This causes the CMGR task to send messages to the CFM task telling it to shutdown communications with each of the other members on the cluster.

The CMGR task may receive the following types of messages from the CFM task:

1. OP - this message is a response to an OP message sent to the CFM task by the CMGR task. If it contains an error code, it means that the CFM task was unable to set up communications with the new member. If there is no error code, the CMGR task makes note of this new member's existence in its existence bitmap. It then checks to see if it is the master. If so, it sends a message to that effect to the new member along with the device/volume information for the cluster.

2. CL - the CMGR task removes the bit for this member in its bitmap.

3. AB - this message is a result of someone entering the "CM -STOP" command. This causes the CMGR task to send the message to the CFM task telling it to close access to all of the other members and then to close down the local Fast RFA group.

The CMGR task may receive the following types of message from another CMGR task which resides on another member of the cluster:

1. cm__master - this message is sent from the master member. This tells the local CMGR task the identity of the master member so that it can send its device/volume information to it for verification.

2. mcl$dvacc - this message is sent master <--> slave requesting that the recipient use part of the message received as a parameter structure block for the DVACC monitor call, which allows remote devices to be configured/deconfigured. If the recipient is the master member, it will notify the other cluster members of the new device by sending them this message if it is able to successfully able to configure the device.

3. mcl$vlacc - this message is similar to the mcl$dvacc message described above, except that it concerns disk and tape volumes.

The CMGR task may receive the following messages from AVR (Automatic Volume Recognition) software:

1. A message containing a parameter structure block which when run will mount the volume locally. If the member is the master, it runs this monitor call immediately, telling the slave members of the new volume, if it mounts successfully. If the member is a slave, it forwards the message to the master so that the above can happen. In this case, the volume will finally be mounted locally if it can be mounted remotely on the master. If it cannot be mounted remotely on the master, it will receive a mcl$vlacc message from the master which will cause it to dismount the partially mounted volume when it is run.

2. A message tells the CMGR task that a local volume has been dismounted. If this member is the master, it forwards it to all the other members, so they may run the message and dismount the volume remotely. if this member is the slave, it sends the message to the master for further distribution as described above.

a. Function: exists_member
      Purpose : This function returns TRUE if the corresponding bit in the member existence bitmap "cur_map" is on for the member named "name". Bits in the bitmap are numbered from 0-15 from left to right.
      Inputs : name - name of the member whose existence bit is checked Outputs : none b. Function: open_pipe
   Purpose : This function gets and opens the CM.PIPE for a particular cluster member (sendee).

Inputs : sendee - name of cluster member whose CM.PIPE file is to be opened
            cm__fib - a pointer to memory for a file information b
   Outputs : cm__fib - a pointer to a filled-in file information block c. Function: read_pipe
   Purpose : This function reads from the pipe >>$$CATALOG>CM.PIPE, placing its input in the global variable "gbl_msg".
   Inputs : none
   Outputs : none d. Function: close_pipe
   Purpose : This function closes and removes the file described by the FIB pointed to by cl_fib.
   Inputs : cl__fib - a pointer to a file information block describing a file to be closed and removed
   Outputs : cl__fib - a pointer to an inactive file information block e. Function: to_CM
   Purpose : This function sends a message of message type "msg__typ" to a CMGR task running on another cluster member named "sendee".

Inputs    :   msg_type: type of message being sent
              sendee  : name of CM who is message
                        recipient f.  Function: from_CM
    Purpose :   This function is called to take the
                appropriate action whenever a
                message is received from a CMGR task
                running on another member.
    Inputs    : none
    Outputs   : none g.  Function: i_am_master
    Purpose :   This function determines whether or
                not a member is the master by
                figuring out the number of the
                member which has the lowest member
                number in the cluster (first bit on
                in the bitmap). It then compares
                this number to the local member
                number. If the local member number
                is less than the lowest number in
                the bitmap, then the member is the
                master (returns TRUE).
    Inputs    : none
    Outputs   : none h.  Function: to_CFM
    Purpose :   This function is used to send a
                message to the CFM group via
                >>$$CATALOG>CFM.PIPE. It waits for
                a response from the CFM task before
                continuing.
    Inputs    : msg - message to be sent to the CFM
                task
    Outputs   : none i. Function: CMON_msg
   Purpose : This function is called to do the appropriate thing when a message is received from the monitor task.
   Inputs : none
   Outputs : none j. Function: CFM_answer
   Purpose : This function is called whenever a message is received from the cluster file manager.
   Inputs : none
   Outputs : none k. Function: notify_all
   Purpose : This function is used to send gbl_msg to all of the members of the cluster. It does not send a msg to the master. It does not send a msg to non_sendee.
   Inputs : non_sendee - name of a specific member to whom this message should not be sent
   Outputs : none l. Function: AVR_action
   Purpose: This routine is called when a message is received from the AVR (Automatic Volume Recognition) software. Messages are of two types:
   a) to tell us a volume has been discontinued
   b) to tell us a volume has been mounted.

When a volume is dismounted, it is up to each CMGR task to tell all of the other members of the cluster about it. When a volume is mounted, it is up to each CMGR task to check with the master to see whether it is okay to mount this volume cluster-wide. Until the CMGR task issues the ACTIVATE volume MCL (MCL$VLACC), the volume is in a semi-mounted state (i.e., all of the file structures have been created in memory, but have been marked so that the system cannot use them). Once the volume has mounted locally, it is up to each CMGR to tell the other members of the cluster to mount the volume remotely. Each CMGR task is required to keep track of all of the semi-mounted volumes on its system that have not been okayed by the master, since if the master crashes before okaying the volume mount, the volume will be stuck in a semimounted state unless the CMGR task re-sends its request to the new master.

Inputs : none
Outputs : none m. Function: swap_vols
Purpose : This function sends messages to "sendee," telling it about the devices & volumes mounted on the system. This allows a member to remotely mount devices and volumes that are local to another system. Volume swapping always occurs between the master member and a non-master, never between two non-masters. The master sends messages that describe all of the local and remote volumes and devices that it knows about, while the non-member only sends messages about the local devices and volumes that it knows about.

Inputs : sendee - name of member with whom you are swapping volumes

Outputs : none n. Function: close_member
   Purpose : This function closes the member specified by 'name.'
   Inputs : name - who I am closing down access to
   Outputs : none o. Function: trap_handler
   Purpose : this function catches any trap that is signalled to this program and terminates it, no matter what the trap. It is here mostly so that the "Unclaimed signal trap" message will not be put out by C if this program is unable to terminate before CFM aborts the group.
   Inputs : sig - unique number of the trap that has been signalled
   Outputs : none VII. Description of Internal Data Structures in HVS Assembly Language 1. The parameter structure block (PSB) for the four cluster-specific MCLs (#10F8-10FB).

```
MCL$CLACC   0X10F8    access to cluster
MCL$MBACC   0x10F9    access to member
MCL$DVACC   0x10FA    access to device
MCL$VLACC   0x10FB    access to volume
```

The bits of the indicators word have the following meaning:

If using "activate/deactivate access to cluster (MCL#10F8)

```
mc_opn   equ   z'8000'   1= attach local member to
                            cluster
mc_cls   equ   z'4000'   1= detach local member from
                            cluster
mc_gin   equ   z'2000'   1= get local member info
mc_gst   equ   z'1000'   1= get     local     member
                            statistics
mc_mst   equ   z'0080'   1= master    member;  0=slave
                            member
```

If using "activate/deactivate" access to other members (MCL #10F9)

```
mc_opn   equ   z'8000'   1= open    access   to local
                            member
mc_cls   equ   z'4000'   1= close   local   access to
                            member
mc_gin   equ   z'2000'   1= get info
mc_gst   equ   z'1000'   1= get statistics
mc_mst   equ   z'0080'   1= master    member;  0=slave
                            member
```

If using "activate/deactivate" access to devs at other mbrs (MCL #10FA)

```
mc_opn   equ   z'8000'   1= configure device
mc_cls   equ   z'4000'   1= deconfigure device
mc_gin   equ   z'2000'   1= get info
mc_gst   equ   z'1000'   1= get statistics
```

If using "activate/deactivate" access to vols at other mbrs (MCL #10FB)

```
mc_opn   equ   z'8000'   1= recognize   volume   going
                            up
```

```
mc_cls    equ    z'4000'    1= recognize volume going
                                down
mc_gin    equ    z'2000'    1= get info
mc_gst    equ    z'1000'    1= get statistics
mc_lop    equ    z'0800'    1= recognize local volume
                                going up
mc_lno    equ    z'0400'    1= do not recognize local
                                volume
```

In C programming language:
```
typedef struct vol_str {
char      c_vid[6];      volume id
char      c_vset[6];     volume set name
unsigned  c_vsn;         volume sequence number
char      pad1[8];       place holder
} VOLDEF;

typedef struct msg_str {
int       c_bksz;        maximum message block size
union {
    int*  c_sndp;        ptr to path of msg sending
                             pipe
    int   off1[2];
} f3;
union {
    int*  c_rcvp;        ptr to path of msg
                             receiving pipe
    int   off2[2];
} f4;
char      c_trbu[12];    transporter BU name
} MSGDEF;

typedef struct name_str {
char      c_cnme[12];    cluster name
char      pad2[10];      place holder
} NAMDEF;

typedef struct device_str {
```

```
    unsigned  c_dtyp;        device type
    char      pad3[20]       place holder
    ) DEVDEF;
```

2. Actual parameter structure block (PSB) definition

```
struct c_psb {
    union {
        char  c_mnme[4];     local mbr name
        int*  c_pthp;        input device path ptr
        int   offset[2];     byte offset to
                             pathname
    } f1;

int   c_rev;             PSB revision number unsigned mc_opn : 1;     indicators word (see
                             description)
    unsigned mc_cls : 1;
    unsigned mc_gin : 1;
    unsigned mc_gst : 1;
    unsigned mc_lop : 1;
    unsigned mc_lno : 1;
    unsigned extral : 2;
    unsigned mc_mst : 1;
    unsigned extra  : 7;

int   c_mnbr;            local member number union {
        NAMDEF  name;        cluster name (see
                             above)
        MSGDEF  msg;         msg fields (see above)
        VOLDEF  vol;         vol fields (see above)
        DEVDEF  device;      device type (see
                             above)
    } f2;
```

```
        char    c_stat[32];          statistics (TBD)
        char    pad4[26];            place for send and
                                     receive paths
        char    pad5[58];            in msgs (c_stat + pad4
                                     + pad5)
};
```

Device type table

| | | |
|---|---|---|
| dv_disk  | 0x2620 | disk device |
| dv_llp   | 0x0110 | local line printer |
| dv_lcrp  | 0x0111 | local card reader/punch |
| dv_prtr  | 0x411E | comm - printer only |
| dv_kbrd  | 0x421F | comm - keyboard only |
| dv_bdit  | 0x431A | bi-directional interactive terminal |
| dv_ubsc  | 0x431B | uni-directional BSC |
| dv_bsc   | 0x431C | BSC 3780 |
| dv_stape | 0x4396 | streamer tape |
| dv_tape  | 0x4397 | 9-track tape |

3. Definition of cluster manager pipe message

```
struct   in_msg  {
    char         sender[4];      who sent me this message
    int          rrt;            response record type
    int          function;       function to perform
    struct c_psb clus_psb;       associated PSB (msg form)
};
```

4. This declaration defines the various IORB extensions used to do physical I/O to the DIRAM cluster controller.

Definition of connect request specific fields

```
typedef   struct    conn_str {
  unsigned wi_cur;                current status bit
                                  map
  unsigned wi_lcl;                local member bit
                                  map
  char     wi_app[12];            full application id
  char     filler1[8];
} CONN_DEF;
```

Definition of read request specific fields

```
typedef    struct    read_str {
  unsigned wi_rma;                read members after
  unsigned wi_rmb;                read members before
  unsigned wi_msg;                message id
  char     filler2[18];
} READ_DEF;
```

Definition of write request specific fields

```
typedef    struct    write_str {
  unsigned wi_wmb;                write members
                                  before
  unsigned wi_wma;                write members after
  unsigned wi_msg;                message id
  char     filler3[18];
} WRITE_DEF;
```

Definition of status request specific fields

```
typedef    struct    status_str {
  unsigned wi_cur;                current status bit
                                  map
  unsigned wi_chg;                change since last
                                  read status
  char     filler4[20];
} STATUS_DEF;
```

Definition of read/write request specific fields

```
typedef    struct    rw_str {
  unsigned wi_wmb;              write   members
                                before
  unsigned wi_wma;              write members after
  unsigned wi_msg;              message id
  int      *wi_omb;             addr of outgoing
                                buffer
  int      wi_orn;              rng of outgoing
                                buffer
  unsigned wi_omi;              outgoing message id
  char     filler5[10];
} RW_DEF;
```

Definition of Statistics request specific fields

```
typedef    struct    stats_str {
  long   wi_rst;                read status Q total
  int    wi_rsc;                read status Q cur len
  int    wi_rsm;                read status Q max len
  long   wi_rdt;                read queue total int    wi_rdc;                read Q current length
  int    wi_rdm;                read Q max length
  long   wi_rvt;                rcvd messages Q total
  int    wi_rvc;                rcvd msgs Q current
                                len
  int    wi_rvm;                rcvd msgs Q max length
} STATS_DEF;
```

Definition of iorb extension for DIRAM physical I/O

```
struct cl_iorb {
  unsigned       io_ext;
  unsigned       wi_int;        internal application
                                id
  int            wi_err;        driver error code
```

```
        union   (
                CONN_DEF        cl_cnct;
                READ_DEF        cl_read;
                WRITE_DEF       cl_write;
                STATUS_DEF      cl_status;
                RW_DEF          cl_rw;
                STATS_DEF       cl_stats;
        } utyp;
);
```

5. Cluster file manager (CFM) input message format definition

```
Possible values for cf_fun - function codes
  "OP" - open a member:      from CMON task
  "CL" - close a member:     from CMON task
  "CA" - close all members:  from CMON task "SV" - specify number of
         servers:            from CM  (-SERVERS n)
                             command "ST" - return member
         status:             from CM  (-STATUS)
                             command "TR" - start/stop trace
         facility:           from CM  (-TRACE)
                             command "AB" - abort CFM:          from CM  (-STOP)
                             command "SU" - start up CFM:       from CMON task
  "SD" - shut down CFM:      from CMGR task struct c_inf {
  char     cf_fun[2];        function code
  int      cf_sts;           return status
  int      cf_typ;           reply record type
  unsigned cf_ind;           indicator word
```

```
    union {
          char    cf_name[4];    member name
          int     cf_srv;        # of servers
    } field1;

char       cf_rfu[18];    rfu - must be 0
    unsigned   cf_lmn;        logical member number
    int        cf_bks;        msg   block   transfer
                              size
    char       cf_snd[58];    path  of  msg  sending
                              pipe
    char       cf_rcv[58];    path  of msg receiving
                              pipe
    char       cf_bu[12];     transport    facility's
                              bu name
    int        cf_nbf;        rfu - must be zero
    char       cf_aid[12];    rfu - must be zero
    char       cf_rf2[88];    rfu - must be zero
};
```

5. Get-Device-Status Parameter Structure Block

This MCL is used by CMGR task to get information about the devices and volumes associated with its local system so that it may pass this information to other members of the cluster MCL$GDS       0x1069   Get device status MCL

```
struct gds_psb {
    int    gds_lfn;       logical file number
    int    *gds_pnp;      device         pathname
                          pointer
    int    gds_rev;       PSB  revision  number
                          (1)
    int    gds_isn;       internal       sequence
                          number
```

```
    unsigned  gds_iin;        input indicators
    unsigned  gds_oin;        output indicators
    char      gds_dnme[12];   device name
    int       gds_lrn;        logical     resource
                              number
    char      gds_vnme[6];    volume name
    int       gds_ift;        internal file type
    char      gds_vset[6];    volume set name
    int       gds_vsn;        volume sequence number
    char      gds_nor[4];     node of residence
    char      gds_rfu[12];    rfu - must be zeros
    int       gds_nou;        number of users
    int       gds_noi;        number of inhibitors
    char      gds_nid[4];     node   id   of   last
                              reserver
    char      gds_gid[2];     group  id   of   last
                              reserver
    char      gds_tid[2];     task   id   of   last
                              reserver
    char      gds_dtc[6];     date - time created
    char      gds_uns[4];     #    of    unallocated
                              logical sectors
    char      gds_mns[4];     max   #   of   logical
                              sectors on volume
    int       gds_lsz;        logical sector size
    char      gds_rfl[8];     rfu - must be zeros
);
```

VII. Description of Fast RFA Message Format

There are two types of fast RFA messages: request messages and response messages. Request messages include header information which describes the type of message, the amount of memory and the identity of the user on whose behelf the request is to be executed. Request messages also include the parameter structure block (PSB) associated with the monitor call to be executed and any additional data (for example, the record data to be written via a write-record request).

Response messages include header information describing the type of message and the status of the request which was executed. The response message also contains the parameter structure block and data normally returned to the user as results from the monitor call (for example the record data in response to a read-record request).

A. Message Header 1:

| Field Name | Size | Description |
|---|---|---|
| message format | 1 byte | Identifies the format of the fast RFA message header:<br>41 hex for #1<br>42 hex for # 2<br>43 hex for # 3 |
| message type | 1 byte | Identifies the type of message being sent or received via fast RFA:<br>01 hex for server request<br>02 hex for server response<br>03 hex for response cancelled<br>04 hex for transmission error<br>05 hex for inconsistency error |
| message id | 2 bytes | A number which uniquely identifies a request and its expected response from the destination member. |

| | | |
|---|---|---|
| message segment information | 2 bytes | For messages which are segmented:<br><br>bit 0: 1=message continues to the next segment<br>bit 1: 1=message continues from previous segment<br>bits 2-F: segment number (relative to 1) |
| message segment length | 2 bytes | Size of in bytes. |
| MCL code | 2 bytes | The value of the monitor call (MCL) being executed. |
| MCL status | 2 bytes | Status resulting from the execution of the monitor call. |

B. Message Header 2:

| Field Name | Size | Description |
|---|---|---|
| MCL request size | 2 bytes | The total size (in bytes) the area necessary to perform the monitor call -- includes space for PSB, record areas, etc. |
| MCL response size | 2 bytes | The total size (in bytes) the expected response -- includes space for PSB, record area, etc. |

| | | |
|---|---|---|
| MCL pointer offset | 2 bytes | The byte offset of the first pointer to be resolved in the attached PSB. This offset is relative to the beginning of the PSB. FFFF in in hex indicates that the PSB has no imbedded pointers to be resolved. Each 32-bit pointer within the PSB consists of two parts: the 16 bit offset of the data that is being addressed relative to the beginning of the PSB) followed by the 16 bit offset of the next pointer to be resolved (FFF hex indicates no more pointers). |
| source node id | 4 bytes | The 4 character ASCII external name of the node from which this message is being sent. |
| source group id | 2 bytes | The 2 character external ASCII id of the group for which this request is to be serviced (ex. "LO"). |
| source task id | 2 bytes | The 2 character ASCII id of the task for which this request is to be serviced (typically 2 spaces indicating for all tasks in the above group). |

3. Message Header 3:

| Field Name | Size | Description |
|---|---|---|
| source user id | 28 bytes | The ASCII id of the user on whose behalf this message request is being sent. A source user id consists of 3 parts -- a 12 character person id followed by a 12 character account id followed by a 3 character mode id. A trailing space follows the 27 character id. |
| source data/time stamp | 6 bytes | A date-time stamp in internal binary format associated with this request. This time stamp is used to prevent record deadlock conditions. |

D. Message PSB and Data Areas:

| Field Name | Size | Description |
|---|---|---|
| PSB | n bytes | The parameter structure block for the monitor call to be executed. All pointers within the PSB have been encoded as described above so that the destination member can resolve the pointers independent of their actual location in the |

| | | |
|---|---|---|
| data | n bytes | source member. The size and contents of this PSB are exactly as described in the previously referenced publications.<br><br>Any data associated with the PSB and monitor call being executed, for example the record contents associated with a write-record or write-block MMCL or the data returned in response to a read-record or read-block MCL. |

VIII. Control Structures in HVS Assembly Language

A. Cluster Descriptor Block (CDB)

```
S_CNME    EQU    0           CLUSTER NAME
S_CIND    EQU    S_CNME+6    INDICATORS
S_MNME    EQU    S_CIND+1    LOCAL MEMBER NAME
S_MNBR    EQU    S_MNME+2    LOCAL MEMBER NUMBER
S_FCBP    EQU    S_MNBR+1    POINTER TO FCB FOR >>
                             $$CATALOG>CM.PIPE
S_STAT    EQU    S_FCBP+2    CLUSTER STATISTICS
S_SZ EQU  S_STAT+16          SIZE OF CDB
```

B. Remote Access FCB (RCB)

File Control Block (FCB):

```
C_FCBP    EQU    0            -> NEXT FCB IN CHAIN
C_FDBP    EQU    $AF          -> FILE DESCRIPTOR
                                 BLOCK (FDB)
C_NCBP    EQU    C_FDBP+$AF   -> NAME CONTROL
                                 BLOCK (NCB)
```

| | | | |
|---|---|---|---|
| C_IND | EQU | C_NCBP+AF | FCB INDICATOR WORD |
| C_IND2 | EQU | C_IND+1 | FCB INDICATOR WORD 2 (ACCESS METHOD SPECIFIC) |
| C_SEM | EQU | C_IND2+1 | FCB LOCK SEMAPHORE |
| C_IND3 | EQU | C_SEM | FCB INDICATOR WORD 3 (ACCESS METHOD SPECIFIC) |
| C_UCBP | EQU | C_SEM+4*$AF+5 | -> USER CONTROL BLOCK (UCB) |
| C_PIND | EQU | C_UCBP+$AF | MCL-IN-PROGRESS INDICATORS |
| C_LFN | EQU | C_PIND+1 | LFN THROUGH WHICH FCB IS RESERVED |
| C_NBF | EQU | C_LFN+1 | NUMBER OF BUFFERS SPECIFIED AT FILE RESERVATION TIME (BITS 0-7) |
| C_CONC | EQU | C_NBF | CONCURRENCY VALUE (BITS 8-15) |
| C_SLCD | EQU | C_CONC+1 | CODE SELECTION VALUE (BITS 0-7) |
| C_UCNT | EQU | C_SLCD | NUMBER OF CURRENT USERS OF THIS FCB (BITS 8-15) |
| C_XDBP | EQU | C_UCNT+1 | -> INDEX FDB THROUGH WHICH FILE WAS RESERVED |
| C_BCBP | EQU | C_XDBP+$AF | -> BUFFER CONTROL BLOCK (BCB) |
| C_IVSN | EQU | C_BCBP+$AF | INITIAL VSN OF THE FILE RESERVATION |
| C_SZ1 | EQU | C_IVSN+1 | SIZE OF FCB NEEDED FOR STORAGE MNGMT |

FCB Indicator Word 1 Masks:

| | | | |
|---|---|---|---|
| MC_OPN | EQU | Z'0003' | BITS 15&14: 00=FCB NOT OPEN |

```
MC_OPD      EQU     Z'0001'     BIT 15: 1=FCB OPEN FOR
                                DATA MNGMT
MC_OPS      EQU     Z'0002'     BIT 14: 1=FCB OPEN FOR
                                STORAGE MNGMT
MC_MEM      EQU     Z'0004'     BIT 13: 1=ALLOCATED
                                FROM SYSTEM MEMORY
MC_SYS      EQU     Z'0008'     BIT 12: 1=SYSTEM SHAR-
                                ABLE FCB
MC_VLD      EQU     Z'0010'     BIT 11: 1=NO FIB VALI-
                                DATION REQUIRED
MC_NWT      EQU     Z'0020'     BIT 10: 1=NO WAIT
                                RECORD LOCKING
MC_NLK      EQU     Z'0040'     BIT  9: 1=NO RECORD
                                LOCKING (DIRTY READ)
MC_FRFA     EQU     Z'0080'     BIT  8: 1=FCB FOR FAST
                                REMOTE FILE ACCESS
MC_INT      EQU     Z'0100'     BIT  7: 1=FCB FOR
                                INTERNAL INTERFACE
MC_UNP,     EQU     Z'0200'     BIT  6: 1=FCB WAS RE-
                                SERVED FOR UNPROTECTED
                                USE (SAVE/RESTORE)
MC_IX0      EQU     Z'0400'     BIT  5: 1=RESERVED FOR
                                INDEX-ONLY ACCESS
MC_ECL      EQU     Z'0800'     BIT  4: 1=FCB WAS RE-
                                SERVED VIA GET ECL
MC_RWA      EQU     Z'1000'     BIT  3: 1=REWRITE
                                FUNCTION ALLOWED
MC_DLA      EQU     Z'2000'     BIT  2: 1=DELETE
                                FUNCTION ALLOWED
MC_WRA      EQU     Z'4000'     BIT  1: 1=WRITE
                                FUNCTION ALLOWED
MC_RDA      EQU     Z'8000'     BIT  0: 1=READ
                                FUNCTION ALLOWED

Extension to FCB for Remote Access:

M_FCBX      EQU     M_FCB+C_SZ  FCB EXTENSION
M_RCBP      EQU     M_FCBX      -> NEXT REMOTE ACCESS
                                FCB
```

| | | | |
|---|---|---|---|
| M_IND | EQU | M_RCBP+$AF | INDICATORS WORD |
| M_DTM | EQU | M_IND+1 | DATE AND TIME OF LAST RFA MESSAGE |
| M_LLRN | EQU | M_DTM+3 | LOCAL LRN FOR REMOTE DEVICE |
| M_RLRN | EQU | M_LLRN+1 | REMOTE LRN FOR REMOTE DEVICE |
| M_LPNM | EQU | M_RLRN+1 | LOCAL PATHNAME FOR REMOTE FILE |
| M_NBF | EQU | M_RVID+6 | REMOTE GET NUMBER OF BUFFERS (BITS 0-7) |
| M_CONC | EQU | M_NBF | REMOTE GET CONCURRENCY (BITS 8-F) |
| M_FTYP | EQU | M_CONC+1 | REMOTE FILE TYPE |
| M_LRSZ | EQU | M_FTYP+1 | REMOTE FILE LOGICAL RECORD LENGTH |
| M_SLCD | EQU | M_LRSZ+1 | REMOTE FILE CODE SELECTION VALUE |
| M_KEND | EQU | M_SLCD+1 | REMOTE FILE LAST KEY LOCATION IN RECORD |
| M_AIO | EQU | M_KEND+3 | STORAGE MNGMT I/O INFORMATION AREA  WORD 0: LAST TRANSFER SIZE  1-2: LAST BLOCK NUMBER | c. <u>Remote Device Descriptor Block (RDB)</u>

| | | | |
|---|---|---|---|
| R_RDBP | EQU | 0 | ->NEXT RDB IN R_RDBP CHAIN |
| R_IND | EQU | R_RDBP+$AF | INDICATORS WORD |
| R_NDBP | EQU | R_IND+1 | -> NODE DESCRIPTOR BLOCK ADDRESS |
| R_NME | | R_NDBP+$AF | DEVICE NAME |
| R_TYP | EQU | R_NME+6 | DEVICE TYPE |

For Tape of Disk Devices:

| | | | |
|---|---|---|---|
| R_VID | EQU | R_TYP+1 | ID OF VOLUME MOUNTED ON DEVICE |
| R_VSET | EQU | R_VID+3 | VOLUME SET NAME |
| R_VSN | EQU | R_VSET+3 | VOLUME SEQUENCE NUMBER |
| R_NOR | EQU | R_VSN+1 | NODE OF RESIDENCE (ASCII) |
| R_SZ | EQU | R_NOR+2 | SIZE OF THE RDB |

RDB Indicator Word (R_IND) Masks:

| | | | |
|---|---|---|---|
| MR_UNV | EQU | Z'0001' | BIT 15: DEVICE CURRENTLY UNAVAILABLE |
| mr_bt | EQU | Z'0002' | BIT 14:LINK TO MEMBER BOOT VOLUME |

RDB Device TPE Word (R_TYP) Masks:

| | | | |
|---|---|---|---|
| MR_DIR | EQU | Z'0020' | BIT 10,11: 10=DIRECTORY |
| MR_DEV | EQU | Z'0010' | 01=DEVICE/TAPE FILE |

It will be obvious to those skilled in the art that many changes may be made to the preferred embodiment of the present invention without departing from its teachings. For example, different message formats and different commands may be used, as well as different types of monitor calls involving other operating system facilities (i.e., local mail facilities, etc.). Also, different types of cluster controllers and drivers may be used. Other changes will be readily apparent to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing computer system comprising:
a plurality of separately bootable computer systems, each computer system including a different plurality of peripheral devices from which data is transferred and received;
a cluster controller for interconnecting each of said systems to be closely coupled the other remaining systems for rapidly transferring information therebetween and said each computer system further including identical monitor call operating system facilities for receiving monitor system calls from application programs running under control of said each computer system, and including means for returning the results to said application programs as a consequence of processing said monitor system calls, said monitor call operating system facilities further including file management facilities for controlling the access of files within said each computer system through a plurality of local drivers for corresponding ones of said plurality of peripheral devices and each computer system further including fast remote facility (FRFA) module means, said FRFA module means including;
input means within each computer system responsive to a start command for enabling said system to operate in a cluster mode of operation concurrent with normal processing operation; and
a cluster file manager (CFM) section included within said monitor call operating system facilities for responding to a number of cluster system calls generated by application programs within any one of said computer systems requesting access to said plurality of said peripheral devices located on other ones of said computer systems enabled for operating in said cluster mode, and;
driver means coupled to said FRFA module means for enabling a rapid communication of cluster system calls through said cluster controller and corresponding ones of said FRFA module means in a predetermined manner so that said application programs in each system has access to all of said plurality of peripheral devices in other systems operating in said cluster mode of operation as if said all of said plurality of peripheral devices were accessible by system calls made to said monitor call facilities through said local drivers.

2. The system of claim 1 wherein said FRFA module means of each computer system further includes:
   a control structure table having a plurality of locations for storing entries designating those computer systems configured to operate in said cluster mode of operation which define a cluster consisting of a number of members and corresponding ones of said plurality of peripheral devices available for operation on each of said members; and,
   a cluster monitor (CMON) module coupled to said control structure table for maintaining information corresponding to a list of cluster members, said CMON module monitoring the status of said list of member computer systems and notifying said CFM module when one of said member computer systems joins or leaves said cluster.

3. The system of claim 2 wherein said FRFA module means further includes:
   a cluster manager resource (CMGR) module coupled to said control structure table for maintaining a cluster member peripheral device and volume information entries pertaining to said cluster and for updating said entries by exchanging information with said FRFA module means of other member systems without said cluster.

4. The system of claim 1 wherein said FRFA module means of each computer system further includes:
   cluster manager module (CM) means included within said input means of said FRFA module means for generating a sequence of monitor call commands to said monitor call operating system facilities in response to said start-up command for providing a control group structure corresponding to a special group within memory for operating each member system in said cluster mode of operation, said control group structure creating a plurality of tasks, a first one of said tasks corresponding to said CMON module, and a second one of said tasks corresponding to said CMGR module.

5. The system of claim 4 wherein said start-up command includes a plurality of parameters, one of said parameters defining a number of server tasks to be created by said sequence of commands, each server task being assignable for processing a message received from any one of said member systems for accessing one of said plurality of peripheral devices connected to said system bus of said member system so as to enable multiple server tasks to process requests simultaneously.

6. The system of claim 2 wherein said CMGR module includes means for performing a master determination function for determining a master FRFA module means from said plurality of member computer systems at the start-up of said system wherein said master determination function is performed by selecting a master system during said start-up based on which one of said plurality of computer systems is the first system to be enabled for said cluster mode of operation.

7. The system of claim 6 wherein said CMGR master determination function means in response to one of said member computer systems leaving said cluster selects as said master system of the remaining member systems, a member system having the lowest member number.

8. The system of claim 4 wherein said CM module means includes means in response to a stop command for shutting down a member generates a sequence of commands for deleting said control group structure and said plurality of tasks created by said control group structure.

9. A system comprising:
   a plurality of independently operated computer systems located in close proximity to each other, each computer system including a system bus, a memory and a set of local peripheral devices which connect in common to said system bus for transferring requests and data therebetween;
   high speed cluster controller having a plurality of channels for interconnecting said plurality of computer systems through said system buses for exchanging messages containing data, status and control information therebetween when any one of said systems is enabled for operation in a cluster mode of operation; and,
   each computer system further including:
   a cluster driver for transferring said messages between said memory and corresponding one of said cluster control channels when said computer system is operating in said cluster mode of operation; and
   a monitor call handler (MCH) module for receiving monitor calls from any one of a number of independently running number of user application programs resident in said memory under control of said each computer system, said MCH module including a file manager for controlling the access of files within said each computer system through different local drivers for corresponding ones of said peripheral devices, said file manager having a cluster file manager portion for responding to a number of cluster system calls generated by application programs within said each computer system requesting access to peripheral devices located on other ones of said plurality of computer systems enabled for operation in said cluster mode, said cluster file manager portion converting any cluster system call designating a peripheral unit attached to another one of said plurality of computer systems being operated in said cluster mode of operation into a message containing unique identification information designating said user application program for transfer to said another one of said plurality of computer systems through said cluster driver and said high speed cluster controller for processing by said monitor call handler module of said another one of said plurality of computer systems in a manner which makes the set of physical devices of each other computer system operating in said cluster mode appear to be attached locally to said system bus of said each computer system as in a single computer system.

10. The system of claim 9 wherein said each system further includes:
   a control structure table having a plurality of locations for storing entries designating those computer systems configured to operate in said cluster mode of operation which define a cluster consisting of a number of members and corresponding ones of said plurality of peripheral devices available for operation on said members;

a cluster monitor (CMON) module coupled to said control structure table for monitoring a list of cluster members within said control structure table, said CMON module monitoring the status of said list of member computer systems and for notifying said CFM module when one of said member computer systems joins or leaves said clusters; and, a cluster manager resource (CMGR) module coupled to said control structure table for maintaining cluster member peripheral device and volume information entries pertaining to said cluster and for updating said entries by exchanging information with other member systems within said cluster.

11. The system of claim 9 wherein said each system further includes:

cluster manager module (CM) means included within said input means for generating a sequence of commands to said monitor call module in response to said start-up command for providing a control group structure corresponding to a special group within memory for operating each member system in said cluster mode of operation, said control group structure creating a plurality of tasks, a first one of said tasks corresponding to said CMON module, and a second one of said tasks corresponding to said CMGR module.

12. The system of claim 11 wherein said start-up command includes a plurality of parameters, one of said parameters defining a number of server tasks to be created by said sequence of commands, each server task being assignable for processing a message received from any one of said member systems for accessing one of said plurality of peripheral devices connected to said system bus of said member system so as to enable multiple server tasks to process requests simultaneously.

13. The system of claim 10 wherein said CMGR module includes means for performing a master determination function for determining a master from said plurality of member computer systems at the start-up of said system wherein said master determination function is performed by selecting a master system during said start-up based on which one of said plurality of computer systems is the first system to be enabled for said cluster mode of operation.

14. The system of claim 13 wherein said CMGR master determination function means in response to one of said member computer systems leaving said cluster selects as said master system of the remaining member systems, a member system having the lowest member number.

15. The system of claim 11 wherein said CM module includes means in response to a stop command for shutting down a member generates a sequence of commands for deleting said control group structure and said plurality of tasks created by said control group structure.

16. A method of organizing a plurality of independently bootable computer systems for cluster wide operation at a single site, each of said computer systems including a system bus to which a plurality of peripheral devices are attached and identical monitor call facilities for receiving system monitor calls from application programs running on each of said computer systems and for returning the results of processing said system monitor calls, said monitor call facilities including a file management facilities for controlling the access of files within a file system through local drivers for corresponding ones of said plurality of peripheral devices connected to said system bus, said method comprising the steps of:

(a) interconnecting a cluster controller to said system buses of each of said systems and configuring said cluster controller to operate in conjunction with a cluster driver included within each of said computer systems for rapidly transferring information therebetween;

(b) loading into the memory of each computer system, a fast remote file access (FRFA) facility for enabling said each computer system to operate in a cluster mode of operation concurrent with normal processing operations;

(c) including in said FRFA facility, a cluster manager module (CM) which can be activated within each computer system by issuing a single start command for generating a sequence of commands which enables said computer system to operate in said cluster mode of operation;

(d) including within said FRFA facility, a cluster file manager (CFM) module which operates as part of said file management facilities for responding to cluster system calls generated by said application programs requesting access to peripheral devices located on other ones of said computer systems enabled for said cluster mode of operation; and, (e) converting each cluster system call received by said CFM module into a form for transfer by the cluster driver of one computer system cluster member through said cluster controller and said cluster driver of another computer system cluster member to said CFM module of said FRFA facility being operated therewith for processing through one of said local drivers of said another computer system cluster member for returning results of such processing as if the system call was made by an application program running locally on said one computer system cluster member.

17. The method of claim 16 wherein said method further includes the steps of:

(f) including in said FRFA facility, a control structure table having a plurality of locations for storing entries designating each of the computer systems enabled to operate in said cluster mode of operation and the peripheral devices available for operation on said members;

(g) monitoring the status of said computer system members by a cluster monitor (CMON) module through accessing said control structure table for notifying said CFM module when one of said computer system members joins or leaves the cluster; and, (h) exchanging information by a cluster manager resource (CMGR) module included within each FRFA facility on the other member systems within said cluster for listing and updating peripheral device and volume information corresponding to said peripheral device entries stored in said control structure table.

18. The method of claim 16 wherein step (b) further includes the steps of:

(i) creating a cluster control group structure corresponding to a special group within memory for operating said computer system member in said cluster mode of operation in response to said start command; and, (j) creating a plurality of tasks by said cluster control group, a first one of said tasks corresponding to said CMON module and a second one of said tasks corresponding to said CMGR module.

19. The method of claim 18 wherein said method further includes the steps of:
(k) creating a number of server tasks corresponding to the number specified by said start command; and,
(l) assigning each server tasks created to process a message request received from any one of said computer system members by accessing one of said plurality of peripheral devices connected to said system bus of said member so as to enable multiple server tasks to process requests simultaneously.

20. A method of organizing a plurality of independently bootable computer systems for cluster wide operation at a single site, each of said computer systems running under control of identical operating system facilities, said each computer system including a system bus to which a plurality of peripheral devices are attach and identical monitor call facilities for receiving monitor calls from application programs running under control of said operating system facilities and for returning the results of processing said system calls, said monitor call facilities including management facilities for controlling the access of said operating system facilities of said each of said computer system, said method comprising the steps of:
(a) interconnecting a cluster controller to said system buses of each of said systems and configuring said cluster controller to operate in conjunction with a cluster driver included within each of said computer systems for rapidly transferring information therebetween;
(b) loading into the memory of each computer system, a fast remote file access (FRFA) facility for enabling said each computer system to operate in a cluster mode of operation concurrent with normal processing operations;
(c) including within said FRFA facility, a cluster manager module (CM) which can be activated by issuing a single start command for generating a sequence of commands which enables said each computer system to operate in said cluster mode of operation;
(d) including within said FRFA facility, a cluster facility manager (CFM) module which operates as part of said management facilities for responding to cluster system calls generated by said application programs requesting access to said operating system facilities on other ones of said computer systems enabled for said cluster mode of operation; and,
(e) converting each cluster system call received by said CFM module into a form for transfer by the cluster driver of one computer system cluster member through said cluster controller and said cluster driver of another computer system cluster member to said CFM module of said FRFA facility being operated therewith for processing through one of said operating system facilities as if the system call was made by an application program running locally on said one computer cluster member.

21. The method of claim 20 wherein said method further includes the steps of:
(f) including in said FRFA facility, a control structure table having a plurality of locations for storing entries designating each of the computer systems enabled to operate in said cluster mode of operation and the operating system facilities available for operation on said members;
(g) including in said FRFA facility, a cluster monitor (CMON) module for monitoring the status of said computer system members by accessing said control structure table and for notifying said CFM module when one of said computer system members joins or leaves the cluster; and,
(h) including a cluster manager resource (CMGR) module within each FRFA facility for listing and updating operating system facility entries corresponding to said operating system facilities stored in said control structure table.

22. The method of claim 21 wherein step (b) further includes the steps of:
(i) creating a cluster control group structure corresponding to a special group within memory for operating said computer system member in said cluster mode of operation in response to said start command; and,
(j) creating a plurality of tasks by said cluster control group structure, a first one of said tasks corresponding to said CMON module and a second one of said tasks corresponding to said CMGR module.

23. The method of claim 22 wherein said method further includes the steps of:
(k) creating a number of server tasks corresponding to the number specified by said start command; and,
(l) assigning each server task created to process a message request received from any one of said computer system members by accessing one of said operating system facilities of said member so as to enable multiple server tasks to process requests simultaneously.

* * * * *